(12) United States Patent
Kanno et al.

(10) Patent No.: US 7,347,980 B2
(45) Date of Patent: Mar. 25, 2008

(54) PROCESS FOR TREATING FLUORINE COMPOUND-CONTAINING GAS

(75) Inventors: Shuichi Kanno, Hitachi (JP); Toshiaki Arato, Hitachinaka (JP); Shinzo Ikeda, Naka-gun (JP); Ken Yasuda, Tokyo (JP); Hisao Yamashita, Hitachi (JP); Shigeru Azuhata, Hitachi (JP); Shin Tamata, Higashiibaraki-gun (JP); Kazuyoshi Irie, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 132 days.

(21) Appl. No.: 10/679,297

(22) Filed: Oct. 7, 2003

(65) Prior Publication Data

US 2004/0047786 A1 Mar. 11, 2004

Related U.S. Application Data

(62) Division of application No. 09/005,006, filed on Jan. 9, 1998.

(30) Foreign Application Priority Data

Jan. 14, 1997 (JP) ................... 9-004349
Jun. 20, 1997 (JP) ................... 9-163717

(51) Int. Cl.
*A62D 3/00* (2007.01)
*B01D 53/86* (2006.01)
(52) U.S. Cl. ............... 423/240 S; 423/245.3; 588/317; 588/406
(58) Field of Classification Search ........... 423/240 S, 423/245.1, 245.3; 588/312, 317, 406
See application file for complete search history.

(56) References Cited

U.S. PATENT DOCUMENTS

| | | | | |
|---|---|---|---|---|
| 3,845,191 A | * | 10/1974 | Bruce, Jr. .................. 588/206 |
| 5,151,263 A | * | 9/1992 | Okazaki et al. ............. 585/208 |
| 5,238,656 A | * | 8/1993 | Tajima et al. ............ 423/240 S |
| 5,245,112 A | * | 9/1993 | Hoshimoto et al. ......... 588/206 |
| 5,276,249 A | | 1/1994 | Greene et al. |
| 5,283,041 A | | 2/1994 | Nguyen et al. |
| 5,378,444 A | * | 1/1995 | Akita et al. .............. 423/240 S |

(Continued)

FOREIGN PATENT DOCUMENTS

DE 43 11 061 4/1993

(Continued)

OTHER PUBLICATIONS

Explanation of Circumstances Concerning Accelerated Examination.

(Continued)

*Primary Examiner*—Ngoc-Yen Nguyen
(74) *Attorney, Agent, or Firm*—Crowell & Moring LLP

(57) ABSTRACT

A gas stream containing at least one fluorine compound selected from the group consisting of compounds of carbon and fluorine, compounds of carbon, hydrogen and fluorine, compounds of sulfur and fluorine, compounds of nitrogen and fluorine and compounds of carbon, hydrogen, oxygen and fluorine is contacted with a catalyst comprising at least one of alumina, titania, zirconia and silica, preferably a catalyst comprising alumina and at least one of nickel oxide, zinc oxide and titania in the presence of steam, thereby hydrolyzing the fluorine compound at a relatively low temperature, e.g. 200°–800° C., to convert the fluorine of the fluorine compound to hydrogen fluoride.

16 Claims, 9 Drawing Sheets

U.S. PATENT DOCUMENTS

| | | | | |
|---|---|---|---|---|
| 5,414,201 | A | * | 5/1995 | Greene .................. 423/240 S |
| 5,457,268 | A | | 10/1995 | Greene et al. |
| 5,460,792 | A | * | 10/1995 | Rosenbaum ............ 423/245.3 |
| 5,622,682 | A | * | 4/1997 | Tom ....................... 423/240 S |
| 5,649,985 | A | * | 7/1997 | Imamura .................... 95/275 |
| 5,710,359 | A | * | 1/1998 | Lercher et al. ............ 588/208 |
| 5,877,391 | A | | 3/1999 | Kanno et al. |
| 5,907,077 | A | * | 5/1999 | Harashima .............. 423/240 S |
| 5,946,055 | A | | 8/1999 | Rosen |
| 6,022,489 | A | | 2/2000 | Izumikawa et al. |
| 6,069,291 | A | * | 5/2000 | Rossin et al. ............... 588/206 |
| 6,426,443 | B1 | | 7/2002 | Rossin et al. |
| 6,509,511 | B1 | | 1/2003 | Rossin |
| 6,602,480 | B1 | * | 8/2003 | Mori ...................... 423/240 S |
| 6,630,421 | B1 | * | 10/2003 | Atobe et al. ................ 502/340 |
| 6,673,326 | B1 | * | 1/2004 | Rossin et al. ............ 423/240 S |
| 6,676,913 | B2 | | 1/2004 | Rossin |
| 6,855,305 | B2 | | 2/2005 | Kanno et al. |
| 6,942,841 | B2 | | 9/2005 | Kanno et al. |
| 7,004,002 | B2 | | 2/2006 | Nishi et al. |
| 7,020,553 | B2 | | 3/2006 | Nakamura et al. |
| 7,048,515 | B2 | | 5/2006 | Shimomura et al. |
| 7,061,081 | B2 | | 6/2006 | Yano et al. |
| 2002/0131913 | A1 | * | 9/2002 | Tamata et al. ............. 422/171 |
| 2002/0150527 | A1 | * | 10/2002 | Rossin .................... 423/240 S |
| 2003/0054640 | A1 | * | 3/2003 | Tamata et al. ............. 438/689 |
| 2004/0191146 | A1 | * | 9/2004 | Shinohara et al. ...... 423/240 R |
| 2005/0082006 | A1 | * | 4/2005 | Kaji et al. ............. 156/345.47 |

FOREIGN PATENT DOCUMENTS

| | | | |
|---|---|---|---|
| EP | 412 456 | | 8/1990 |
| EP | 412 456 | | 2/1991 |
| EP | 0475442 | | 3/1992 |
| EP | 485 787 | | 5/1992 |
| EP | 0 516 850 | * 12/1992 | ............ 423/240 S |
| EP | 597 393 | | 5/1993 |
| EP | 642 809 | | 8/1994 |
| FR | 2 573 324 | * 5/1986 | ............ 423/240 S |
| JP | 62 273 039 | | 11/1987 |
| JP | 3 047 516 | | 2/1991 |
| JP | 3-249920 | * 11/1991 | ............ 423/240 S |
| JP | 4 122 419 | | 4/1992 |
| JP | 4-290523 A | | 10/1992 |
| JP | 6-59388 | | 8/1994 |
| JP | 7 080 303 | | 3/1995 |
| JP | 7-80303 | | 3/1995 |
| JP | 7 116 466 | | 5/1995 |
| JP | 8 000 963 | | 1/1996 |
| JP | 9-163717 A | | 6/1997 |
| JP | 10-172543 | | 6/1998 |
| JP | 10-192653 A | | 7/1998 |
| JP | 11-70322 A | | 3/1999 |
| WO | WO97/49479 | | 2/1997 |

OTHER PUBLICATIONS

Japanese Office Action.
European Search Report.
Declaration of Interference between U.S. Appl. No. 10/676,013 and U.S. Patent No. 6,673,326, Patent Interference 105,402 (McK) Technology Center 1700, Dec. 13, 2005.
Memorandum Opinion and Order of Interference between U.S. Appl. No. 10/676,013, and U.S. Patent No. 6,673,326, Patent Interference 105,402 (McK) Technology Center 1700, Dec. 13, 2005.
Kanno's Submission of an Annotated Copy of Claims, Jan. 10, 2006.
Declaration of Interference, U.S. Patent No. 6,673,326 v. U.S. Appl. No. 10/676,013, Patent Interference No. 105,402 (McK), Technology Center 1700, Dec. 13, 2005.
Memorandum Opinion and Order, Patent Interference No. 105,402 (McK), Technology Center 1700, Dec. 13, 2005.
Kanno's Submission of a Clean Copy of Claims, Patent Interference No. 105,402 (McK), Technology Center 1700, Dec. 22, 2005.
Kanno's Designation of Lead and Backup Counsel, Patent Interference No. 105,402 (McK), Technology Center 1700, Dec. 22, 2005.
Kanno's Notice of Related Proceedings, Patent Interference No. 105,402 (McK), Technology Center 1700, Dec. 22, 2005.
Kanno's Designation of the Real Party-In-Interest, Patent Interference No. 105,402 (McK), Technology Center 1700, Dec. 22, 2005.
Kanno's Request for File Copies, Patent Interference No. 105,402 (McK), Technology Center 1700, Dec. 22, 2005.
Rossin's Request for File Copies, Patent Interference No. 105,402 (McK), Technology Center 1700, Dec. 27, 2005.
Rossin's Designation of the Real Party-In-Interest, Patent Interference No. 105,402, (McK), Technology Center 1700, Dec. 27, 2005.
Rossin's Notice of Related Proceedings, Patent Interference No. 105,402 (McK), Technology Center 1700, Dec. 27, 2005.
Rossin's Designation of Lead and Backup Counsel, Patent Interference No. 105,402 (McK), Technology Center 1700, Dec. 27, 2005.
Rossin's Submission of a Clean Copy of Claims, Patent Interference No. 105,402 (McK), Technology Center 1700, Dec. 27, 2005.
Kanno's Submission of an Annotated Copy of Claims, Patent Interference No. 105,402 (McK), Technology Center 1700, Jan. 10, 2006.
Kanno's Submission of Japanese Priority Documents, Patent Interference No. 105,402 (McK), Technology Center 1700, Jan. 12, 2006.
Rossin's Response to Memorandum and Order, Patent Interference No. 105,402 (McK), Technology Center 1700, Jan. 13, 2006.
Memorandum Opinion and Order, Patent Interference No. 105,402 (McK), Technology Center 1700, Jan. 18, 2006.
Order - - New Standing Order, Patent Interference No. 105,402 (McK), Technology Center 1700, Jan. 18, 2006.
Kanno's Amended Notice of Related Proceedings, Patent Interference No. 105,402 (McK), Technology Center 1700, Jan. 23, 2006.
Kanno's Proposed List of Motions, Patent Interference No. 105,402 (McK), Technology Center 1700, Jan. 23, 2006.
Preliminary List of Substantive and Responsive Motions, Patent Interference No. 105,402 (McK), Technology Center 1700, Jan. 23, 2006.
Kanno's Amended Designation of Lead and Backup Counsel, Patent Interference No. 105,402 (McK), Technology Center 1700, Jan. 27, 2006.
Kanno Letter to Honorable Fred E. McKelvey, Patent Interference No. 105,402 (McK), Technology Center 1700, Jan. 27, 2006.
Preliminary Motions - Default times for taking action.
Kanno's Uncontested Miscellaneous Motion 1 (To Cancel Claim 28 and Add Claim 38), Patent Interference No. 105,402 (McK), Technology Center 1700, Jan. 31, 2006.
Order— Motion Times, Patent Interference No. 105,402 (McK), Technology Center 1700, Feb. 6, 2006.
Kanno Letter to Honorable Fred E. McKelvey, Patent Interference No. 105,402 (McK), Technology Center 1700, Mar. 8, 2006.
Kanno Letter to Honorable Fred E. McKelvey, Patent Interference No. 105,402 (McK), Technology Center 1700, Mar. 8, 2006.
Revised order Setting Time for Filing Motions, Patent Interference No. 105,402 (McK), Technology Center 1700, Mar. 10, 2008.
Kanno Priority Statement, Patent Interference No. 105,402 (McK), Technology Center 1700, Apr. 21, 2006.
Kanno Substantive Motion 1 (for accorded benefit of Japanese patent applications), Patent Interference No. 105,402 (McK), Technology Center 1700, Apr. 21, 2006.
Kanno Substantive Motion 2 (to declare U.S. Patent No. 6,673,326 unpatentable), Patent Interference No. 105,402 (McK), Technology Center 1700, Apr. 21, 2006.
Kanno Substantive Motion 3 (to substitute Count A for Count 1), Patent Interference No. 105,402 (McK), Technology Center 1700, Apr. 21, 2006.
Kanno Substantive Motion 4 (to add Count B), Patent Interference No. 105,402 (McK), Technology Center 1700, Apr. 21, 2006.

Kanno Substantive Motion 5 (to add Count C), Patent Interference No. 105,402 (McK), Technology Center 1700, Apr. 21, 2006.
Rossin's Notice of Filing of Priority Statement, Patent Interference No. 105,402 (McK), Technology Center 1700, Apr. 21, 2006.
Rossin's Substantive Motion 4 (for benefit of an earlier application), Patent Interference No. 105,402 (McK), Technology Center 1700, Apr. 21, 2006.
Rossin's Substantive Motion 6 (for judgement that senior party claims are unpatentable), Patent Interference No. 105,402 (McK), Technology Center 1700, Apr. 21, 2006.
Rossin Miscellaneous Motion 8 (to issue a Certificate of Correction), Patent Interference No. 105,402 (McK), Technology Center 1700, Apr. 21, 2006.
Rossin Letter to Honorable Fred E. McKelvey, Patent Interference No. 105,402 (McK), Technology Center 1700, Apr. 24, 2006.
Kanno Objections to Rossin Exhibits, Patent Interference No. 105,402 (McK), Technology Center 1700, Apr. 28, 2006.
Rossin Submission of List of Objections, Patent Interference No. 105,402 (McK), Technology Center 1700, Apr. 28, 2006.
Rossin Objections to Kanno Exhibits, Patent Interference No. 105,402 (McK), Technology Center 1700, May 5, 2006.
Rossin Objections to Kanno Exhibits (Amended), Patent Interference No. 105,402 (McK), Technology Center 1700, May 9, 2006.
Order— Miscellaneous, Patent Interference No. 105,402 (McK), Technology Center 1700, May 29, 2006.
Kanno Notice of Deferral of Opposition 6, Patent Interference No. 105,402 (McK), Technology Center 1700, Jun. 8, 2006.
Kanno Substantive Motion 2 Erratum, Patent Interference No. 105,402 (McK), Technology Center 1700, Jun. 8, 2006.
Kanno Substantive Motion 5 Errata, Patent Interference No. 105,402 (McK), Technology Center 1700, Jun. 8, 2006.
Kanno Opposition 4, Patent Interference No. 105,402 (McK), Technology Center 1700, Jun. 16, 2006.
Rossin Opposition 1, Patent Interference No. 105,402 (McK), Technology Center 1700, Jun. 16, 2006.
Rossin Opposition 2, Patent Interference No. 105,402 (McK), Technology Center 1700, Jun. 16, 2006.
Rossin Opposition 3, Patent Interference No. 105,402 (McK), Technology Center 1700, Jun. 16, 2006.
Rossin Opposition 4, Patent Interference No. 105,402 (McK), Technology Center 1700, Jun. 16, 2006.
Rossin Opposition 5, Patent Interference No. 105,402 (McK), Technology Center 1700, Jun. 16, 2006.
Kanno Objections to Rossin Exhibits (No. 2), Patent Interference No. 105,402 (McK), Technology Center 1700, Jun. 23, 2006.
Kanno Opposition 8, Patent Interference No. 105,402 (McK), Technology Center 1700, Jul. 7, 2006.
Rossin's Response to Kanno's Objections (No. 2), Patent Interference No. 105,402 (McK), Technology Center 1700, Jul. 7, 2006.
Order—Submission of Exhibits, Patent Interference No. 105,402 (McK), Technology Center 1700, Jul. 19, 2006.
Conference Calls, Patent Interference No. 105,402 (McK), Technology Center 1700, Jul. 19, 2006.
Rossin Opposition 2 Errata, Patent Interference No. 105,402 (McK), Technology Center 1700, Jul. 19, 2006.
Order Expunging Papers, Patent Interference No. 105,402, (McK), Technology Center 1700, Jul. 21, 2006.
U.S. Appl. No. 11/334,345 (Kanno et al.) filed Jan. 19, 2006.
http://www.webster.com/dictionary/boehmite, Merriam-Webster Online (no date).
Watkins, "Strength in Numbers," *Chemical*, Oct. 22, 2001, pp. 30-34, vol. 79, No. 43, CENEAR 79 43, ISSN 0009-2347.
Kanno Patent Family, Kanno Exhibit 1010, *Rossin v. Kanno*, Contested Case 105,402.
Office Action dated Jun. 24, 1999 from U.S. Appl. No. 09/005,006.
U.S. Appl. No. 10/676,013 (Kanno et al.) as filed Oct. 2, 2003.
Certified copy of Japanese patent application No. 9-004349 filed Jan. 14, 1997, Kanno Exhibit 1017, *Rossin v. Kanno*, Contested Case 105,402.
Certified copy of Japanese patent application No. 9-163717 filed Jun. 20, 1997, Kanno Exhibit 1018, *Rossin v. Kanno*, Contested Case 105,402.
http://en.wikipedia.org/wiki/Benzene, Wikipedia, the free encyclopedia, "Benzene," Apr. 17, 2006.
"Hexaflurobenzene, 99.9%" - Specifications, Jun. 14, 1994.
"Tetrafluoromethane" Specifications, Dec. 2, 1994.
Kanno Exhibit 1025, *Rossin v. Kanno*, Contested Case 105,402.
Kanno Exhibit 1026, *Rossin v. Kanno*, Contested Case 105,402.
*John B. Adrain v. Hypertech, Inc.*, Case Law, Order dated Apr. 18, 2001, Westlaw citation: 2001 WL 740542 (D. Utah).
*ISCO International, Inc. v. Conductus, Inc. et al.*, Case Law, Memorandum and Order dated Nov. 8, 2002, Westlaw citation: 2002 WL 31498989 (D. Del.).
*ROHM Co., Ltd. v. Nichia Corporation et al.*, Case Law, Memorandum and Order dated Nov. 26, 2003, Westlaw citation: 2003 WL 22844207 (E.D.Pa.).
In the Matter of Certain Personal Watercraft and Components Thereof, United States International Trade Commission (U.S.I.T.C), Order No. 23: Denying Complainants' Motion for Summary Determination of Infringement of claim 24 of U.S. Patent No. 4,811,560 and Findings of Uncontroverted Material Facts, USITC Inv. No. 337-TA-452, Jul. 24, 2001.
Kanno Notice of Cross-Examination of Joseph A. Rossin, Patent Interference No. 105,402 (McK), Technology Center 1700, Jun. 19, 2006.
Rossin Miscellaneous Motion 8 (to issue a Certificate of Correction), Patent Interference No. 105,402 (McK), Technology Center 1700, Apr. 21, 2006.
Rossin Patent Family, Kanno Exhibit 1035, *Rossin v. Kanno*, Contested Case 105,402.
U.S. Appl. No. 09/398,177 (Rossin) as filed Sep. 17, 1999.
Declaration of Joseph A. Rossin Under 37 C.F.R. § 1.132 filed in U.S. Appl. No. 09/398,177, dated Jul. 2, 2001.
Terminal Disclaimer to Obviate a Double Patenting Rejection over a Prior Patent filed in U.S. Appl No. 10/036,073 (Rossin), dated Jan. 23, 2003.
Terminal Disclaimer filed in U.S. Appl. No. 09/168,302 (Rossin) dated Aug. 21, 2000.
Supplemental Information Disclosure Statement filed in U.S. Appl. No. 09/633,609 (Rossin et al.) dated Oct. 16, 2001.
Transcript of Oral Deposition of Joseph A. Rossin, Jun. 21, 2006, *Joseph A. Rossin et al. v. Shuichi Kanno et al.*
Declaration of Shuichi Kanno, Patent Interference No. 105,402 (McK), Technology Center 1700, Jun. 30, 2006.
Declaration of Shin Tamata, Patent Interference No. 105,402 (McK), Technology Center 1700, Jun. 30, 2006.
Response dated May 2, 2002 to Office Action filed in U.S. Appl. No. 09/168,302 (Rossin) filed Oct. 7, 1998.
Office Action mailed on Mar. 22, 2002 in U.S. Appl. No. 09/168,302 (Rossin) filed Oct. 7, 1998.
Transmittal Letter for application dated Oct. 7, 1998 U.S. Appl. No. 09/168,302 (Rossin).
Patent Application Transmittal Letter for application dated Sep. 17, 1999 for U.S. Appl. No. 09/398,177 (Rossin).
BIB Data Sheet, Utility Patent Application Transmittal, Fee Transmittal, and Certificate of Mailing for U.S. Appl. No. 10/103,073 dated Mar. 21, 2002.
Application for U.S. Patent Under 37 C.F.R. § 1.53(b) Transmittal Form for U.S. Appl. No. 10/319,012 dated Dec. 13, 2002.
Combined Declaration and Power of Attorney for U.S. Appl. No. 09/398,177 dated Sep. 16, 1999.
Office Action mailed Apr. 4, 2001 in U.S. Appl. No. 09/398,177.
Amendments and Remarks dated Jul. 5, 2001 filed in U.S. Appl. No. 09/398,177.
Office Action mailed Jul. 23, 2001, in U.S. Appl. No. 09/398,177.
Office Action mailed Aug. 21, 2002 in U.S. Appl. No. 09/398,177.
Notice of Allowability dated Aug. 11, 2003 in U.S. Appl. No. 10/103,073.
Supplemental Declaration and Power of Attorney filed in U.S. Appl. No. 10/103,073 dated Sep. 10, 2003.
Office Action mailed Mar. 28, 2000 in U.S. Appl. No. 09/168,302.
Office Action mailed Oct. 12, 2000 in U.S. Appl. No. 09/168,302.
Response dated Aug. 21, 2000 filed U.S. Appl. No. 09/168,302.
Office Action mailed May 13, 1999 in U.S. Appl. No. 08/662,129.
Office Action mailed Jun. 1, 1999 in U.S. Appl. No. 08/662,129.

Response dated Oct. 13, 1999 filed in U.S. Appl. No. 08/662,129.
Combined Declaration and Power of Attorney filed in U.S. Appl. No. 10/103,073 dated Sep. 16, 1999.
Combined Declaration and Power of Attorney filed in U.S. Appl. No. 10/319,012 dated Oct. 19, 1998.
Office Action mailed Jul. 1, 2002 in U.S. Appl. No. 10/103,073.
Request for Continued Examination filed in U.S. Appl. No. 10/103,073 filed Dec. 31, 2002.
Terminal Disclaimer to Obviate a Double Patenting Rejection over a Prior Patent filed in U.S. Appl. No. 10/103,073 dated Jul. 21, 2003.
Office Action mailed Feb. 20, 2003 in U.S. Appl. No. 10/103,073.
Terminal Disclaimer filed in U.S. Appl. No. 09/398,177 dated Jul. 3, 2001.
Facsimile from Guild Associates, Inc. to Joe Rossin dated Apr. 19, 1996 enclosing "Catalytic Process for the Decomposition of Perfluoroalkanes".
Patent Application Transmittal Letter dated Jun. 12, 1996.
Filing Receipt for U.S. Appl. No. 08/662,129.
Specification, Claims and Abstract for U.S. patent application entitled "Catalytic Process for the Decomposition of Perfluoroalkanes".
Preliminary Amendment dated May 30, 2000.
Check number 9234 made payable to Asst. Commissioner for Patents in the amount of $1,310.00 dated May 30, 2000.
Patent Application Transmittal Letter dated May 30, 2000.
United States Post Office Express Mail receipt dated May 30, 2000.
Corrected Filing Receipt dated Nov. 1, 2000 for U.S. Appl. No. 09/580,889.
Office Action mailed Aug. 28, 2001 in U.S. Appl. No. 09/580,889.
Email correspondence dated May 17, 2000 from Christopher Buntel to Joseph A. Rossin.
Email correspondence dated Jun. 29, 2000 from Joseph Rossin to Christopher Buntel.
Declaration of Joseph A. Rossin, Patent Interference No. 105,402 (McK), Technology Center 1700, Apr. 20, 2006.
Application for United States Letters Patent (Specification, Claims, Abstract, Drawings) entitled "Catalyst Compositions and Catalytic Processes for the Degradation of Perfluorinated Compounds and Hydrofluorocarbons," Rossin et al., dated Aug. 7, 2000.
Utility Patent Application Transmittal dated Aug. 7, 2003.
Filing Receipt dated Oct. 3, 2000 for U.S. Appl. No. 09/633,609.
Declaration for "Catalyst Compositions and Catalytic Processes for the Degradation of Perfluorinated Compounds and Hydrofluorocarbons," dated Jul. 14, 2000.
New Declaration for U.S. Appl. No. 09/633,609 dated Feb. 9, 2006.
Certificate of Correction for U.S. Patent No. 6,673,326 B1 (U.S. Appl. No. 09/633,609).
Terminal Disclaimer to Obviate a Double Patenting Rejection over a "Prior" Patent for U.S. Patent No. 6,673,326 B1 (U.S. Appl. No. 09/633,609), dated Mar. 7, 2006.
Statement Under 37 C.F.R. 3.73(b) dated Mar. 7, 2006 filed in U.S. Patent No. 6,673,326 B1 (U.S. Appl. No. 09/633,609).
Letter to "Petitions" for U.S. Patent No. 6,673,326 B1 (U.S. Appl. No. 09/633,609) dated Apr. 20, 2006.
Transmittal Letter and Supplemental Information Disclosure Statement filed in U.S. Appl. No. 09/633,609 dated Oct. 16, 2001.
PTO-1449 filed in U.S. Appl. No. 09/633,609.
Office Action mailed Feb. 13, 2002 in U.S. Appl. No. 09/633,609.
Declaration and Power of Attorney for U.S. Appl. No. 08/662,129 dated Aug. 16, 1996.
Amendment Under 37 C.F.R. § 1.312 dated Apr. 16, 2002 filed in U.S. Appl. No. 09/580,889.
Langan et al., "Strategies for greenhouse gas reduction," *Solid State Technology*, Jul. 1996, pp. 115-122, PenWell Publication.
Worth et al., "Analysis of Data for Perfluorocompound (PFC) Emission Control Systems," SEMATECH, Jun. 30, 1995, Technology Transfer #95062847A-ENG, pp. 1-40.
Assignment Recordation Cover Sheet dated Aug. 20, 1996 with Assignment dated Aug. 16, 1996 for U.S. Appl. No. 08/662,129.
Notice of Recordation of Assignment Document dated Nov. 8, 1996 with copy of Assignment filed in U.S. Appl. No. 08/662,129, Reel 8115 Frame 0425.
Verified Statement Claiming Small Entity Status filed in U.S. Appl. No. 08/662,129 dated Aug. 19, 1996.
Assignment Recordation Cover Sheet dated Mar. 25, 2002 with Assignment dated Aug. 16, 1996 for U.S. Appl. No. 09/580,889.
Notice of Recordation of Assignment Document dated Jun. 11, 2002 with copy of Assignment filed in U.S. Appl. No. 09/580,889, Reel 012784 Frame 0993.
Corrected Assignment Recordation Cover Sheet dated Sep. 16, 2003 with original Recordation Form Cover Sheet dated Nov. 6, 2000 with Assignment dated Nov. 2, 2000 for U.S. Appl. No. 09/633,609.
Notice of Recordation of Assignment Document dated Apr. 16, 2004 for U.S. Appl. No. 09/633,609, Reel 014508 Frame 0765.
Declaration Claiming Small Entity Status dated Oct. 5, 2000 filed in U.S. Appl. No. 09/633,609.
Request for Filing a Patent Application Under 37 C.F.R. § 1.53(b) for U.S. Appl. No. 10/676,013 dated Oct. 2, 2003.
Office Action mailed Jun. 24, 1999 in U.S. Appl. No. 09/005,006.
Response to Restriction Requirement and Transmittal of Certified Priority Documents dated Jul. 26, 1999 filed in U.S. Appl. No. 09/005,006.
Office Action mailed Mar. 13, 2001 in U.S. Appl. No. 09/005,006.
Office Action mailed May 9, 2002 in U.S. Appl. No. 09/005,006.
Office Action mailed Sep. 24, 2002 U.S. Appl. No. 09/005,006.
Amendment dated Jan. 22, 2003 filed in U.S. Appl. No. 09/005,006.
Office Action mailed Apr. 9, 2003 in U.S. Appl. No. 09/005,006.
Reply to Office Action dated Nov. 19, 2003 filed in U.S. Appl. No. 09/005,006.
Office Action mailed Dec. 23, 2003 in U.S. Appl. No. 09/005,006.
Office Action mailed Jul. 13, 2004 in U.S. Appl. No. 09/005,006.
Office Action mailed Nov. 17, 2005 in U.S. Appl. No. 09/005,006.
Declaration of John Schlaechter, Patent Interference No. 105,402 (McK), Technology Center 1700, Apr. 20, 2006.
Patent Application Filing U.S. Appl. No. 09/005,006 dated Jan. 9, 1998 (Specification, Claims, Abstract, Drawings).
Combined Declaration and Power of Attorney for application entitled, "Process for Treating Fluorine Compound-Containing Gas" dated Feb. 28, 1998.
Revocation of Power of Attorney and Appointment of New Power of Attorney dated Nov. 15, 2001 filed in U.S. Appl. No. 09/005,006.
Preliminary Amendment dated Oct. 2, 2003.
Amendment dated Feb. 12, 2002 filed in U.S. Appl. No. 09/005,006.
Declaration under 37 C.F.R. § 1.132 dated Feb. 7, 2002 filed in U.S. Appl. No. 09/005,006.
Declaration (pp. 1-3) filed Nov. 10, 2003 in U.S. Appl. No. 09/005,006.
Preliminary Amendment filed Aug. 9, 2002 in U.S. Appl. No. 09/005,006.
National Science Foundation Phase I Final Report, Project Title: "Catalytic Oxidation of CFC's and Related Compounds for Pollution Abatement Applications," Program Name: SBIR/DMII, PI/PD Name: Joseph A. Rossin, Ph.D., Effective Date: Feb. 01, 1995.
http://www.nsf.gov/policies/foia.jsp, Freedom of Information Act (FOIA) and Privacy Act, National Science Foundation, Jun. 14, 2006.
Certified copy of U.S. Appl. No. 08/662,129 dated Jun. 9, 2006.
http://www.nsf.gov/pubs/gpg/nsf04_23/6.jsp, Chapter VI-Grant Administration Highlights, National Science Foundation, Jun. 15, 2006.
Kiplinger et al., "Activation of Carbon-Fluorine Bonds by Metal Complexes," *Chem. Rev.*, 1994, pp. 373-431, vol. 94, American Chemical Society.
Feaver et al., "The catalytic decomposition of $CHF_3$ over $ZrO_2$-$SO_4$," *Catalysis Today*, 1999, pp. 13-22, vol. 54, Elsevier Science B.V.
Certified copy of U.S. Appl. No. 09/580,889 dated May 10, 2006.
http://www.nsf.gov/awardsearch/shoAward.
do?AwardNumber=9531289, Award Abstract #9531289, "SBIR Phase II: Catalytic Oxidation of Chlorofluorocarbons and Related Compounds for Pollution Abatement Applications," National Science Foundation, Jun. 15, 2006.
Iskenderova, "Cleaning Process in High Density Plasma Chemical Vapor Deposition Reactor," A Thesis Submitted to the Faculty of Drexel University, Oct. 2003, pp. 1-109.

Office Action mailed Oct. 19, 2001 in U.S. Appl. No. 09/633,609.

National Science Foundation, Freedom of Information Act Report for Oct. 1, 1997 through Sep. 30, 1998, pp. 1-4.

Acknowledged PTO-1449 dated Sep. 28, 1999 from U.S. Appl. No. 09/005,006.

PTO-1449 filed U.S. Appl. No. 09/005,006.

4 sheets of PTO-892 forms from U.S. Appl. No. 09/005,006.

Certified copy of The Phase I Final Report under the NSF funded grant numbered 9460097 with NSF's publication policies and procedures effective during 1995-1996.

Bickle et al., "Catalytic destruction of chlorofluorocarbons and toxic chlorinated hydrocarbons," *Applied Catalysis B Environmental*, 1994, pp. 141-153, vol. 4, Elsevier Science BV.

Specification, claims and abstract entitled "Catalytic Process for the Decomposition of Perfluoroalkanes".

Smart, "3. Characteristics of C-F Systems," *Organofluorine Chemistry, Principles and Commercial Applications*, 1994, pp. 57-88, Plenum Press, New York.

Green et al., "4. Perfluorocarbon Fluids," *Organofluorine Chemistry, Principles and Commercial Applications*, 1994, pp. 89-119, Plenum Press, New York.

Gerstenberger et al., "Method of Fluorination in Organic Chemistry," *Angew. Chem. Int. Ed. Engl.*, 1981, pp. 647-667, vol. 20, Verlag Chemi GmbH, Weinheim.

Kulawiec et al., "Coordination Chemistry of Halocarbons," *Coordination Chemistry Reviews*, 1990, pp. 89-115, vol. 99, Elsevier Science Publishers BV, Amsterdam.

Strauss, "The Search for Larger and More Weakly Coordinating Anions," *Chem. Rev.*, 1993, pp. 927-942, vol. 93, American Chemical Society.

Chemical Reviews Table of Contents vol. 94, No. 2: Mar. 1994.

Hughes, "Organo-Transition Metal Compound Containing Perfluorinated Ligands," *Advances in Organometallic Chemistry*, 1990, pp. 183-267, Academic Press, Inc.

Table of Contents for *Catalysis Today*, Nov. 26, 1999, pp. 1-190, vol. 54, Issue 1.

Halocarbon 14, P-4665-E, Praxair Material Safety Data Sheet, Oct. 2001, pp. 1-8, Praxair Technology, Inc.

Nitrogen Trifluoride, P-4854-D, Praxair Material Safety Data Sheet, Sep. 2004, pp. 1-8, Praxair Technology, Inc.

Iskenderova, "Cleaning process in high density plasma chemical vapor deposition reactor," http://innopac.library.drexel.edu/search/Y?SEARCH=iskenderova&searchscope=7&SORT, Drexel University Libraries Catalog, Jul. 7, 2006.

Iskenderova, "Cleaning process in high density plasma chemical vapor deposition," http://dspace.library.drexel.edu/handle/1860/344, Drexel University Libraries, Jul. 7, 2006.

http://www.airproducts.com/Responsibility/EHS/ProductSafety/ProductSafetyInformation/Safetygrams.htm, Jul. 7, 2006.

"Safetygram #28, Nitrogen Trifluoride ($NF_3$)," Air Products.

Dibeler et al., "Mass Spectrometric Study of Photoionization. XIV. Nitrogen Trigluroride and Trifluoramine Oxide," *Inorganic Chemistry*, 1969, p. 1728.

Publication Search Results for "freedom of information act report," National Science Foundation, http://www.nsf.gov/publications/ods/results.cfm?TextQuery. . . , Jul. 7, 2006.

* cited by examiner

US 7,347,980 B2

PROCESS FOR TREATING FLUORINE COMPOUND-CONTAINING GAS

This application is a divisional of U.S. patent application Ser. No. 09/005,006, filed Jan. 9, 1998.

BACKGROUND OF THE INVENTION

1) Field of the Invention

The present invention relates to a process for efficient decomposition treatment of a gas containing fluorine compounds such as $C_2F_6$, $CF_4$, $C_3F_8$, $C_4F_8$, $CHF_3$, $SF_6$, $NF_3$, etc. at a low temperature.

2) Related Art

Fluorine compound gases such as $CF_4$, $C_2F_6$, etc. are used in a large amount as a semiconductor etchant, a semiconductor cleaner, etc. However, it was found that these compounds, once discharged into the atmosphere, turn into warming substances causing global warming. Post-treatment of these compounds after their use would be subject to a strict control in the future.

Compounds having a high fluorine (F) content as a molecule constituent such as $CF_4$, $C_2F_6$, etc. have a higher electronegativity of fluorine and thus are chemically very stable. From this nature it is very hard to decompose such fluorine compounds, and it is thus in the current situations that no appropriate processes for such decomposition treatment are not available yet.

JP-B-6-59388 (U.S. Pat. No. 5,176,897) discloses a $TiO_2$—$WO_3$ catalyst for hydrolysis of organic halogen compounds. The catalyst contains 0.1 to 20% by weight of W on the basis of $TiO_2$ (i.e. 92% to 99.96% of Ti by atom and 8 to 0.04% by atom of W) and has a decomposition rate of 99% at 375° C. for a duration of 1,500 hours in treatment of $CCl_4$ in ppm order. JP-B-6-59388 suggests that organic halogen compounds having a single carbon atom, such as $CF_4$, $CCl_2F_2$, etc. can be decomposed, but shows no examples of decomposition results of fluorine compounds.

JP-A-7-80303 discloses another $Al_2O_3$—$ZrO_2$—$WO_3$ catalyst for decomposition of fluorine compound gases. The catalyst is directed to combustion-decomposition of CFCs (chlorofluorocarbons) and has a decomposition rate of 98% for a duration of 10 hours in treatment of CFC-115 ($C_2ClF_5$) by combustion-decomposition reaction at 600° C. The disclosed process needs addition of hydrocarbons such as n-butane, etc. as a combustion aid, resulting in a higher treatment cost. Among organic halogen compounds to be treated, fluorine compounds are less decomposable than chlorine compounds. Furthermore, the more the carbon atoms of organic halogen compound, the less decomposable. Decomposition of compounds consisting only of carbon and fluorine such as $C_2F_6$, etc. are much less decomposable than CFC-115, but no examples of decomposition results of such compounds are shown therein.

SUMMARY OF THE INVENTION

An object of the present invention is to provide a process for efficient decomposition treatment of compounds of carbon and fluorine, compounds of carbon, hydrogen and fluorine, compounds of sulfur and fluorine, compounds of nitrogen and fluorine and even compounds of carbon, hydrogen, fluorine and oxygen such as $C_2F_6$, $CF_4$, $C_3F_8$, $C_4F_8$, $CHF_3$, $SF_6$ and $NF_3$.

The present invention provides a process for treating a fluorine compound-containing gas, which comprises contacting a gas stream containing at least one fluorine compound selected from the group consisting of compounds of carbon and fluorine, compounds of carbon, hydrogen and fluorine, compounds of sulfur and fluorine, compounds of nitrogen and fluorine and compounds of carbon, hydrogen, oxygen and fluorine with a catalyst containing at least one of alumina, titania, zirconia and silica in the presence of steam, thereby hydrolyzing the fluorine compound to convent fluorine of the fluorine compound to hydrogen fluoride.

DESCRIPTION OF THE PREFERRED EMBODIMENTS

Figure 1:
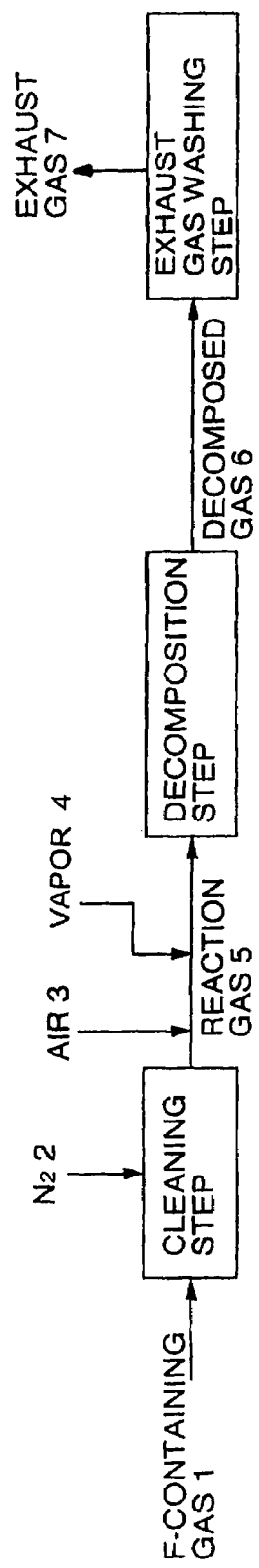
FIG. 1 is a block diagram showing a process for treating a fluorine compound-containing gas according to one embodiment of the present invention.

As a result of extensive studies on development of catalysts for decomposition of fluorine compound-containing gases, the present inventors have found that catalysts must contain a metallic component capable of forming an appropriately strong bond with fluorine as the nature of catalysts, and further have found that catalysts containing a metallic component having a higher fluoride formation enthalpy show a higher decomposition activity particularly in case of compounds consisting of carbon and fluorine, because molecules of such compounds are stable by themselves. Formation of too stable a bond will gradually lower the decomposition activity of catalysts, because fluorine compounds are less releasable from the catalyst surface, whereas too weak a bonding force will not attain a satisfactory decomposition rate. $C_2F_6$, one of gases to be treated according to the present invention, is a compound of poor reactivity because of a higher intramolecular force, and it is said that a temperature of 1,500° to 2,000° C. is required for combustion of such a gas.

As a result of tests on various catalysts, the present inventors have found that catalysts of alumina ($Al_2O_3$), titania (TiO$_2$), zirconia (ZrO$_2$), silica (SiO$_2$), a mixture of titania and zirconia, a mixture of alumina and magnesia (MgO), a mixture of alumina and titania, or a mixture of alumina and silica can hydrolyze fluorine compounds, and further have found that the fluorine compounds can be decomposed at a lower temperature than 800° C. thereby.

Among these catalysts, it has been found that a catalyst based on a mixture of alumina and titania has the highest activity and particularly a catalyst comprising 75 to 98% by weight of alumina and 25 to 2% by weight of titania has a particularly high activity. It can be presumed that the alumina of the catalyst based on a mixture of alumina and titania acts to attract fluorine compounds onto the catalyst, whereas the titania acts to depart the fluorine compounds from the catalyst surface.

The present inventors further have found that catalysts based on the mixture of alumina and titania further containing at least one member selected from the group consisting of zirconia, tungsten oxide, silica, tin oxide, ceria, bismuth oxide, nickel oxide and boron oxide can hydrolyze fluorine compounds. It has been found that above all the catalyst containing zirconia has a higher decomposition activity on fluorine compounds. It has been further found that the content of at least one member selected from the group consisting of zirconia, tungsten oxide, silica, tin oxide, ceria, bismuth oxide, nickel oxide and boron oxide is preferably 0.1 to 10% by weight on the basis of sum total of alumina and titania and particularly the content of zirconia is preferably 2 to 10% by weight on the basis of sum total of alumina and titania. It seems that these additive members exist in the form of single oxides or composite oxides and contribute to an improvement of decomposition activity on fluorine compounds.

In catalyst preparation, it has been found that it is preferable to use boehmite for alumina raw material and a titanium sulfate solution for a titania raw material. It has been confirmed that there are sulfate ions, SO$_4^{2-}$, in the catalysts prepared from the titanium sulfate solution and the decomposition activity on fluorine compounds can be improved by the presence of sulfate ions. It has been found that addition of sulfuric acid is preferable during the catalyst preparation.

The present inventors further tested catalysts containing other components besides alumina and titania, specifically catalysts containing alumina and one of zinc oxide (ZnO), nickel oxide (NiO), iron oxide, tin oxide (SnO$_2$), platinum (Pt), cobalt oxide, zirconia (ZrO$_2$), ceria (CeO$_2$) and silica (SiO$_2$). As a result, it has been found that these catalysts can hydrolyze fluorine compounds and particularly catalysts containing zinc oxide or nickel oxide have a higher activity than catalysts based on the mixture of alumina and titania. It has been further found that catalysts comprising alumina and nickel oxide, admixed with sulfuric acid during the catalyst preparation have a higher activity than the catalyst without admixing with sulfuric acid. It has not been confirmed in which forms iron oxide or cobalt oxide of the catalysts containing the iron oxide or the cobalt oxide exists. Probably it seems to exist in the form of Fe$_2$O$_3$ or Co$_3$O$_4$.

It has been found that the catalysts comprising alumina and one of Zinc oxide, nickel oxide, iron oxide, tin oxide, cobalt oxide, zirconia, ceria and silica as other components preferably contain 50 to 1% by atom of one metallic element of the other components, the balance being aluminum of the alumina, and the content of platinum is preferably 0.1 to 2% by weight on the basis (100% by weight) of alumina. It has been further found that these catalysts can further contain sulfur and the content of sulfur is preferably 0.1 to 20% by weight on the basis of the alumina catalyst.

Fluorine compounds to be treated according to the present invention include, for example, CF$_4$, C$_2$F$_6$, C$_3$F$_8$, C$_4$F$_8$, C$_5$F$_8$, CHF$_3$, CH$_2$F$_2$, CH$_3$F, C$_2$HF$_5$, C$_2$H$_2$F$_4$, C$_2$H$_3$F$_3$, C$_2$H$_4$F$_2$, C$_2$H$_5$F, CH$_2$OCF$_2$, SF$_6$, NF$_3$, etc., among which CF$_4$, C$_2$F$_6$, C$_3$F$_8$, C$_4$F$_8$, CHF$_3$, SF$_6$ and NF$_3$ are used as etchants for semiconductors and CF$_4$, C$_2$F$_6$ and NF$_3$ are used as cleaners for semiconductors.

According to the present invention, all of these fluorine compounds can be hydrolyzed. Hydrolysis temperature depends upon kinds of fluorine compounds and catalyst components, and is usually 200° to 800° C., preferably 400° to 800° C. According to the present process fluorine of fluorine compound gases can be converted to hydrogen fluoride.

Hydrolysis of fluorine compounds can proceed typically according to the following reaction equations:

$$CF_4 + 2H_2O \rightarrow CO_2 + 4HF \tag{1}$$

$$C_2F_6 + 3H_2O \rightarrow CO + CO_2 + 6HF \tag{2}$$

$$CHF_3 + H_2O \rightarrow CO + 3HF \tag{3}$$

$$SF_6 + 3H_2O \rightarrow SO_3 + 6HF \tag{4}$$

$$NF_3 + 3/2\ H_2O \rightarrow NO + 1/2\ O_2 + 3HF \tag{5}$$

Hydrolysis according to reaction equations (2) and (3) can produce CO. The present catalysts also have an ability to oxidize CO, and thus CO can be further oxidized to CO$_2$ in the presence of oxygen.

The present invention provides a process for hydrolyzing a fluorine compound-containing gas by a catalyst comprising at least one member selected from the group consisting of alumina, titania, zirconia, silica, a mixture of titania and zirconia, a mixture of alumina and magnesia, a mixture of alumina and titania and a mixture of alumina and silica.

Furthermore, the present invention provides a process for treating a fluorine-containing gas by a catalyst comprising alumina and titania, further containing 0.1 to 10% by weight, on the basis of alumina and titania, of one of zirconia, tungsten oxide, silica, tin oxide, ceria, bismuth oxide, nickel oxide and boron oxide.

Still furthermore, the present invention provides a process for treating a fluorine compound-containing gas by a catalyst comprising alumina and at least one member selected from the group consisting of zinc oxide, nickel oxide, iron oxide, tin oxide, cobalt oxide, zirconia, ceria, silica and platinum as other components, a ratio of aluminum of alumina to the metallic element of at least one of other components by atom is 50 to 99:50–1, and further by the catalyst further containing 0.1 to 20% by weight of sulfur on the basis of the alumina. These additive components can contribute to improvement of decomposition activity of the catalysts on fluorine compounds in the form of single oxides or composite oxides with aluminum and/or other additive components.

Still furthermore, the present invention provides a process for converting fluorine in a gas to hydrogen fluoride, which comprises contacting a gas stream containing a fluorine compound comprising C$_2$F$_6$ with a catalyst comprising a mixture of alumina and titania and having a weight ratio of alumina to titania being 65 to 90:35 to 10, thereby hydrolyzing the fluorine compounds. Still furthermore, the present invention provides a process for converting fluorine in a gas stream to hydrogen fluoride, which comprises contacting a gas stream comprising a fluorine compound comprising $C_2F_6$ with a catalyst comprising a mixture of alumina, titania and zirconia and having a weight ratio of alumina to titania being 65 to 90:35 to 10 and a weight ratio of zirconia to sum total of alumina and titania being 2 to 10:98 to 90, thereby hydrolyzing the fluorine compound.

Still furthermore, the present invention provides a process for converting fluorine in a gas stream to hydrogen fluoride, which comprises contacting a gas stream containing at least one fluorine compound selected from the group consisting of $C_2F_6$, $CF_4$, $C_4F_8$ and $CHF_3$ with a catalyst comprising a mixture of alumina and zinc oxide and having an atomic ratio of aluminum to zinc being 90 to 70:10 to 30, thereby hydrolyzing the fluorine compound.

Still furthermore, the present invention provides a process for converting fluorine in a gas stream to hydrogen fluoride, which comprises contacting a gas stream containing at least one fluorine compound selected from the group consisting of $C_2F_6$, $CF_4$, $C_3F_8$, $CHF_3$, $NF_3$ and $SF_6$ with a catalyst comprising a mixture of alumina and nickel oxide and having an atomic ratio of aluminum to nickel of 95 to 60:5 to 40, thereby hydrolyzing the fluorine compound.

Still furthermore, the present invention provides a process for converting fluorine in a gas stream to hydrogen fluoride, which comprises contacting a gas stream comprising a fluorine compound comprising $C_4F_8$ with a catalyst comprising a mixture of alumina, nickel oxide and zinc oxide, thereby hydrolyzing the fluorine compound.

Still furthermore, the present invention provides a process for converting fluorine in a gas stream to hydrogen fluoride, which comprises a hydrolysis step of contacting a gas discharged from a semiconductor-etching or cleaning step using a gas stream containing at least one fluorine compound selected from the group consisting of compounds of carbon and fluorine, compounds of carbon, hydrogen and fluorine, compounds of sulfur and fluorine, compounds of nitrogen and fluorine and compounds of carbon, hydrogen, oxygen and fluorine, after addition of air and steam to the gas, with a catalyst comprising at least one of alumina, titania, zirconia and silica, thereby hydrolyzing the fluorine compound to convert the fluorine in the gas to hydrogen fluoride, as a poststep to the semiconductor-etching or cleaning step.

Still furthermore, the present invention provide a process for treating a fluorine compound-containing gas, which further comprises an alkaline washing step of contacting the gas from the hydrolysis step with an alkaline washing solution, thereby washing the gas as a poststep to the hydrolysis step. As the alkaline washing solution, there can be used conventional ones such as a solution of NaOH, $Ca(OH)_2$, $Mg(OH)_2$, $CaCO_3$, etc., a slurry of $Ca(OH)_2$, etc.

In contacting of the gas stream containing a fluorine compound with the catalyst, the concentration of the fluorine compound in the gas stream is preferably 0.1 to 10% by volume, particularly preferably 0.1 to 3% by volume, and the space velocity is preferably 100 to 10,000 $h^{-1}$, particularly preferably 100 to 3,000 $h^{-1}$. Space velocity ($h^{-1}$) is defined by reaction gas flow rate (ml/h)/catalyst volume (ml).

In the hydrolysis of the fluorine compound, it is desirable to add steam as a hydrogen source for hydrolysis to the gas stream so as to make the amount of hydrogen atoms (H) at least equal to the amount of fluorine atoms (F) contained in the fluorine compound, thereby making the fluorine atoms (F) of decomposition products into the hydrogen fluoride (HF) form that allows easy post-treatment. Hydrogen, hydrocarbons, etc. can be used as a hydrogen source besides the steam. In case of hydrocarbons as a hydrogen source, hydrocarbons can be combusted on the catalyst, thereby effectively reducing the heat energy to be supplied.

By adding an oxidizing gas such as oxygen, etc. to the reaction gas, oxidation reaction of CO can be carried out at the same time. When the oxidation reaction of CO is incomplete, the decomposition product gas is brought into contact with the CO oxidizing catalyst, after removal of HF from the decomposition product gas, to convert CO to $CO_2$.

In the hydrolysis (decomposition) of fluorine compound, the reaction temperature is preferably about 200° to about 800° C. Above about 800° C., a higher decomposition rate can be obtained, but the catalyst will be rapidly deteriorated, and also the corrosion rate of apparatus structural materials will be abruptly increased, whereas below about 200° C. the decomposition rate will be lowered.

As the step of neutralizing and removing the formed HF, washing by spraying an alkaline solution is efficient and preferable because of less occurrence of clogging in pipings due to crystal deposition, etc. Bubbling of the decomposition product gas through the alkaline solution or washing with the alkaline solution through a packed column may be used for the neutralization and removal of the formed HF. Alternatively, HF can be absorbed in water, followed by treatment with an alkaline solution or slurry.

As the raw material for aluminum (Al) for preparing the present catalyst, γ-alumina and a mixture of γ-alumina and δ-alumina can be used besides boehmite. However, it is preferable to use boehmite as a raw material for Al to form an oxide through final firing.

As the raw material for titanium (Ti), titania sol, titanium slurry, etc. can be used besides titanium sulfate.

As the third metallic components for silica (Si), magnesium (Mg), zirconium (Zr), etc., their various nitrates, ammonium salts, chlorides, etc. can be used.

The present catalyst can be prepared by any of ordinary procedures for preparing catalysts, such as precipitation, impregnation, kneading, etc.

The present catalyst can be used as such or upon molding into a granular form, a honeycomb form, etc. by an desired molding procedure such as extrusion molding, tabletting, tumbling granulation, etc., or as a coating on ceramic or metallic honeycombs or plates.

Only a catalytic reactor for decomposing fluorine compounds and a facility for neutralizing and removing acid components in the decomposition product gas are required for an apparatus for carrying out the present process for treating fluorine compound-containing gas.

The present invention will be described in detail below, referring to Examples which are not limitative of the present invention.

FIG. 1 shows an example of using the present process for hydrolysis treatment of a fluorine gas in a cleaning step in a plasma CVD apparatus in the semi-conductor production process.

The plasma CVD apparatus is an apparatus for vapor depositing a $SiO_2$ film on a semiconductor wafer surface. Since the $SiO_2$ film tends to deposit on the entire interior surfaces of the apparatus, and thus it is necessary to remove $SiO_2$ depositions from unwanted surfaces. To clean the unwanted surface to remove $SiO_2$ therefrom, gases containing fluorine compounds such as $C_2F_6$, $CF_4$, $NF_3$, etc. are used as a cleaning gas. Cleaning gas 1 containing these fluorine compounds is led to a CVD chamber to remove $SiO_2$ under plasma excitation. Then, the chamber is flushed with a $N_2$ gas 2, thereby diluting the cleaning gas to a desired lower fluorine compound concentration, and the diluted cleaning gas is discharged from the chamber. The discharged gas is admixed with air 3 to further lower the fluorine compound concentration by dilution with air 3 and the air-diluted discharged gas is further admixed with steam 4 and the resulting reaction gas 5 is led to a decomposition step, where the reaction gas is brought into contact with a catalyst at a desired space velocity ($h^{-1}$), which is defined by reaction gas flow rate (ml/h)/catalyst volume (ml) and at a desired temperature. In that case, the reaction gas may be heated or the catalyst may be heated by an electric oven, etc. The resulting decomposition gas 6 is led to an exhaust gas washing step, where the decomposition gas 6 is sprayed with an aqueous alkaline solution to remove acid components from the decomposition gas 6 and the resulting exhaust gas 7 freed from the acid components is discharged to the system outside.

$CF_4$, $C_2F_6$ and $NF_3$ can be used as etchants for semiconductors, etc., and $CHF_3$, $C_3F_6$, $SF_6$ and $C_4F_8$ can be also used as etchants besides the above-mentioned fluorine compounds. These etchants can be treated and decomposed in the same manner as in FIG. 1 except that the cleaning step of FIG. 1 is only replaced with an etching step.

Activities or performances of various catalysts for composing fluorine compounds were investigated, and results thereof will be described below:

EXAMPLE 1

A $C_2F_6$ gas having a purity of 99% or more was diluted with air, and further admixed with steam to prepare a reaction gas. Steam for the admixture was prepared by feeding pure water into a reactor tube from the top at a flow rate of 0.11 ml/min. by a microtube pump and gasified. The reaction gas had a $C_2F_6$ concentration of about 0.5%. Then, the reaction gas was brought into contact with various catalysts heated to 700° C. in a reactor tube at a space velocity of 3,000 $h^{-1}$. Heating of the catalyst was carried out by heating the reactor tube in an electric oven.

Reactor tube was an Inconel reactor tube having an inner diameter of 19 mm, where a catalyst bed was fixed at the center of the reactor tube and had an Inconel thermowell for a thermo couple, 3 mm in outer diameter, inside the catalyst bed. Decomposition product gas discharged from the catalyst bed was bubbled through an aqueous sodium chloride solution an then discharged as an exhaust gas. $C_2F_6$ decomposition rate was calculated by the following equation by determining concentration of $C_2F_6$ in the reaction gas at the inlet to the reactor tube and concentration of $C_2F_6$ in the decomposition gas at the outlet from the alkaline washing step by FID (flame ionization detector) gas chromatography and TCD (thermal conductivity detector) gas chromatography:

$$\text{Decomposition rate} = 1 - \frac{\text{Concentration of discharged fluorine compound}}{\text{Concentration of fed fluorine compound}} \times 100 \, (\%)$$

Catalyst 1: $Al_2O_3$

Granular alumina (NKHD-24, trademark of a product commercially available from Sumitomo Chemical Co., Ltd., Japan) was pulverized, sieved to obtain a fraction of 0.5–1 mm grain sizes, followed by drying at 120° C. for 2 hours and firing (or calcining) at 700° C. for 2 hours.

Catalyst 2: $TiO_2$

Granular titania (CS-200-24, trademark of a product commercially available from Sakai Chemical Industry Co., Ltd., Japan) was pulverized, sieved to obtain a fraction of 0.5–1 mm grain sizes, followed by drying at 120° C. for 2 hours and firing at 700° C. for 2 hours.

Catalyst 3: $ZrO_2$ 200 g of zirconyl nitrate was dried at 120° C. for 2 hours and fired at 700° C. for 2 hours. The resulting powders were placed in a mold and compression molded under a pressure of 500 kgf/cm². The molded product was pulverized and sieved to obtain zirconia grains having grain sizes of 0.5–1 mm.

Catalyst 4: $SiO_2$

Granular silica (CARIACT-10, trademark of a product commercially available from Fuji Silysia Co., Ltd., Japan) was pulverized and sieved to obtain a fraction of 0.5–1 mm grain sizes, followed by drying at 120° C. for 2 hours and firing at 700° C. for 2 hours.

Catalyst 5: $TiO_2$—$ZrO_2$

Granular titania (CS-200-24) was pulverized to grain sizes of 0.5 mm and under. 100 g of the resulting powders was admixed with 78.3 g of zirconyl nitrate and kneaded while adding pure water thereto. After the kneading, the kneaded mixture was dried at 120° C. for 2 hours and fired at 700° C. for 2 hours. The resulting powders were placed in a mold and compression molded under a pressure of 500 kgf/cm². The molded product was pulverized and sieved to obtain grains having grain sizes of 0.5–1 mm. The resulting grain composition for catalyst was in an atomic ratio of Ti:Zr=81:19 and in a weight ratio of $TiO_2$:$ZrO_2$=73.5:26.5.

Catalyst 6: $Al_2O_3$—MgO

Granular alumina (NKHD-24) was pulverized to grain sizes of 0.5 mm and under. 100 g of the resulting powders were admixed with 56.4 g of magnesium nitrate and kneaded while adding pure water thereto. After the kneading, the kneaded mixture was dried at 120° C. for 2 hours and fired at 700° C. for 2 hours. The resulting powders were placed into a mold and compression molded under a pressure of 500 kgf/cm². The molded product was pulverized and sieved to obtain grains having grain sizes of 0.5–1 mm. The resulting grain composition for catalyst was in an atomic ratio of Al:Mg=90:10 and in a weight ratio of $Al_2O_3$:MgO=91.9:8.1.

Catalyst 7: $Al_2O_3$—$TiO_2$

Granular alumina (NKHD-24) was pulverized to grain sizes of 0.5 mm and under. 100 g of the resulting powders were admixed with 17.4 g of dried powders of a metatitanic acid slurry and kneaded while adding pure water thereto. After the kneading, the kneaded mixture was dried at 120° C. for 2 hours and fired at 700° C. for 2 hours. The resulting powders were placed in a mold and compression molded under a pressure of 500 kgf/cm². The molded product was pulverized and sieved to obtain grains having grain sizes of 0.5–1 mm. The resulting grain composition for catalyst was in an atomic ratio of Al:Ti=90:10 and in a weight ratio of $Al_2O_3$:$TiO_2$=85.2:14.8.

Catalyst 8: $Al_2O_3$—$SiO_2$

Granular alumina (NKHD-24) was pulverized to grain sizes of 0.5 mm and under. 100 g of the resulting powders were admixed with 13.2 g of dried powders of $SiO_2$ sol and kneaded while adding pure water thereto. After the kneading, the kneaded mixture was dried at 120° C. for 2 hours and fired at 700° C. for 2 hours. The resulting powders were placed in a mold and compression molded under a pressure of 500 mgf/cm². The molded product was pulverized and sieved to obtain grains having grain sizes of 0.5–1 mm. The resulting grain composition for catalyst was in an atomic ratio of Al:Si=90:10 and in a weight ratio of $Al_2O_3$:$SiO_2$=88.3:11.7.

Figure 2:
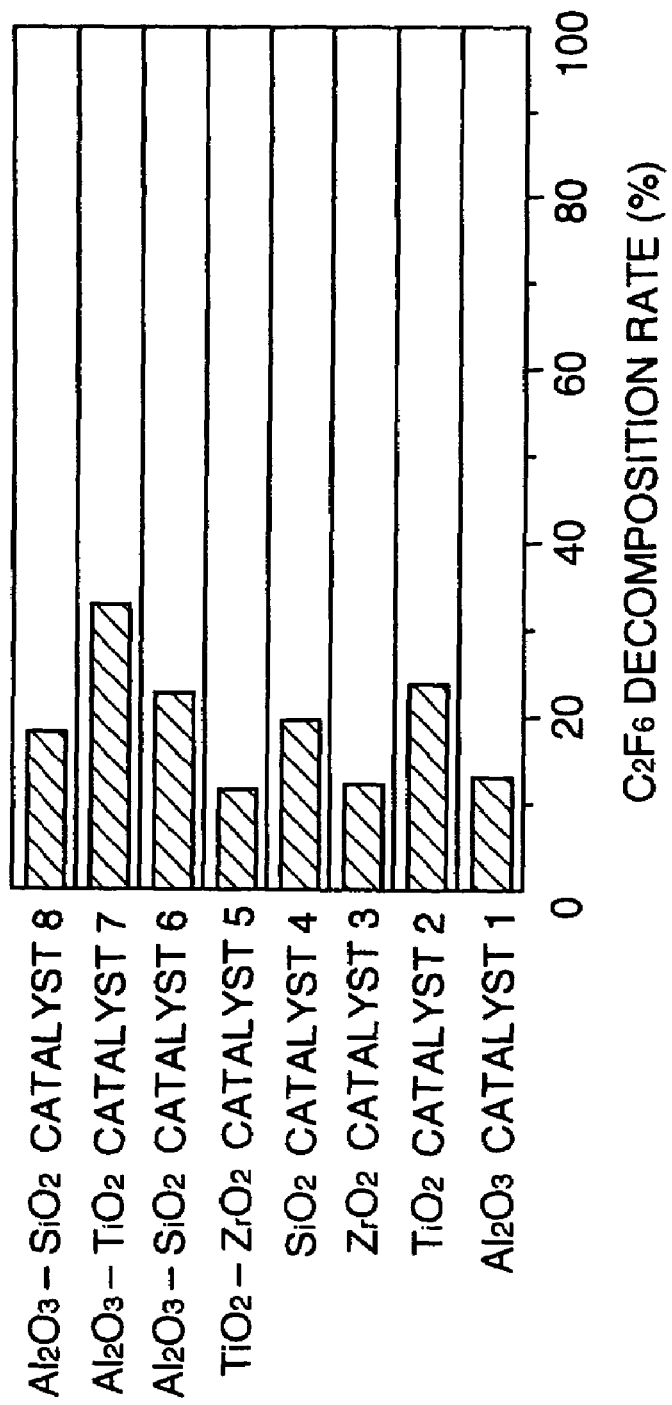
FIG. 2 is a graph showing performances of various catalysts for decomposing a fluorine compound.

Test results of the above-mentioned catalysts 1 to 8 are shown in FIG. 2, from which it is evident that the $Al_2O_3$—TiO catalyst is preferable as a hydrolysis catalyst for a $C_2F_6$ gas.

EXAMPLE 2

Figure 4:
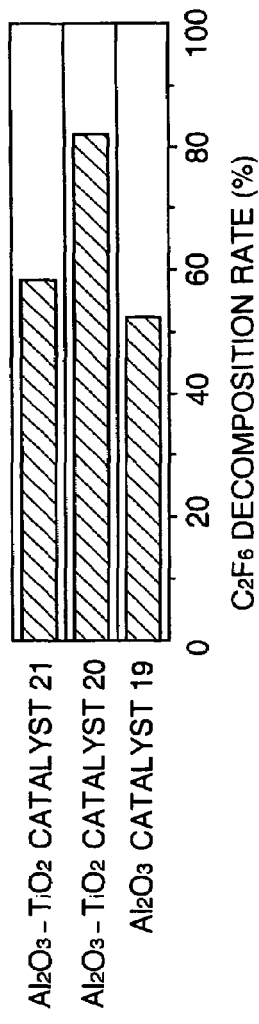
FIG. 4 is a graph showing performances of various catalysts for decomposing a fluorine compound.

In this Example, influences of changes in composition ratios of alumina to titania in $Al_2O_3$—$TiO_2$ catalysts upon $C_2F_6$ decomposition rate were investigated under the same test procedure and conditions as in Example 1. The results are shown in FIG. 4.

Catalyst 19: $Al_2O_3$

Boehmite powders (PURAL SB, trademark of a product commercially available from Condea Co., Ltd.) were dried at 120° C. for 2 hours. 200 g of the resulting dried powders were fired at 300° C. for 0.5 hours and further fired at an elevated temperature of 700° C. for 2 hours. The resulting powders were placed into a mold and compression molded under a pressure of 500 kgf/cm². The molded product was pulverized and sieved to obtain grains having grain sizes of 0.5–1 mm, and tested. It was found that boehmite powders used as an alumina raw material had a higher catalytic activity than granular alumina.

Catalyst 20: $Al_2O_3$—$TiO_2$

Boehmite powders (PURAL SB) were dried at 120° C. for one hour. 200 g of the resulting dried powders were kneaded with 248.4 g of an aqueous 30% titanium sulfate solution, while adding about 200 g of pure water thereto. After the kneading, the kneaded mixture was dried at 250°–300° C. for about 5 hours and then fired at 700° C. for 2 hours. The resulting powders were placed into a mold and compression molded under a pressure of 500 kgf/cm². The molded product was pulverized and sieved to obtain grains having grain sizes of 0.5–1 mm and tested. The resulting grain composition for catalyst was in an atomic ratio of Al:Ti=90:10 and in a weight ratio of $Al_2O_3$:$TiO_2$=85.65:14.35.

Catalyst 21: $AlO_3$—$TiO_2$

Boehmite powders (PURAL SB) were dried at 120° C. for one hour. 200 g of the resulting dried powders were kneaded with about 100 g of an aqueous solution containing 78.6 g of 30% titania sol in pure water. After the kneading, the kneaded mixture was dried at 120° C. for about 2 hours and then fired at 700° C. for 2 hours. The resulting powders were placed into a mold and compression molded under a pressure of 500 kgf/cm². The molded product was pulverized and sieved to obtain grains having grain sizes of 0.5–1 mm and tested. The resulting grain composition for catalyst was in an atomic ratio of Al:Ti=91:9 and in a weight ratio of $Al_2O_3$:$TiO_2$=86.25:13.75.

It was found that the catalyst prepared from the titanium sulfate solution as a titanium raw material had the highest catalytic activity, probably because of the presence of sulfate ions $SO_4^{2-}$ in the catalyst.

EXAMPLE 3

In this Example, influences of changes in composition ratios of $Al_2O_3$ to $TiO_2$ in $Al_2O_3$—$TiO_2$ catalysts upon $C_2F_6$ decomposition rate were investigated under the same procedure and conditions as in Example 1.

Catalyst 22: $Al_2O_3$—$TiO_2$

Boehmite powders (PURAL SB) were dried at 120° C. for one hour. 100 g of the resulting dried powders were kneaded with 82.4 g of an aqueous 30% titanium sulfate solution while adding about 120 g of pure water thereto. After the kneading, the kneaded mixture was dried at 250°–300° C. for about 5 hours and then fired at 700° C. for 2 hours. The resulting powders were placed into a mold and compression molded under a pressure of 500 kgf/cm². The molded product was pulverized and sieved to obtain grains having grain sizes of 0.5–1 mm and tested. The resulting grain composition for catalyst was in an atomic ratio of Al:Ti=93:7 and in a weight ratio of $Al_2O_3$:$TiO_2$=90.0:10.0.

Catalyst 23: $Al_2O_3$—$TiO_2$

Boehmite powders (PURAL SB) were dried at 120° C. for one hour. 100 g of the resulting dried powders were kneaded with 174.4 g of an aqueous 30% titanium sulfate solution while adding about 70 g of pure water thereto. After the kneading, the kneaded mixture was dried at 250°–300° C. for about 5 hours and then fired at 700° C. for 2 hours. The resulting powders were placed into a mold and compression molded under a pressure of 500 kgf/cm². The molded product was pulverized and sieved to obtain grains having grain sizes of 0.5–1 mm and tested. The resulting grain composition for catalyst was in an atomic ratio of Al:Ti=87:13 and in a weight ratio of $Al_2O_3$:$TiO_2$=80.9:19.1.

Catalyst 24: $Al_2O_3$—$TiO_2$

Boehmite powders (PURAL SB) were dried at 120° C. for one hour. 100 g of the resulting dried powders were kneaded with 392 g of an aqueous 30% titanium sulfate solution while adding the latter to the former. After the kneading, the kneaded mixture was dried at 250°–300° C. for about 5 hours and then fired at 700° C. for 2 hours. The resulting powders were placed into a mold and compression molded under a pressure of 500 kgf/cm². The molded product was pulverized and sieved to obtain grains having grain sizes of 0.5–1 mm and tested. The resulting grain composition for catalyst was in an atomic ratio of Al:Ti=75:25 and in a weight ratio of $Al_2O_3$:$TiO_2$=65.4:34.6.

Figure 5:
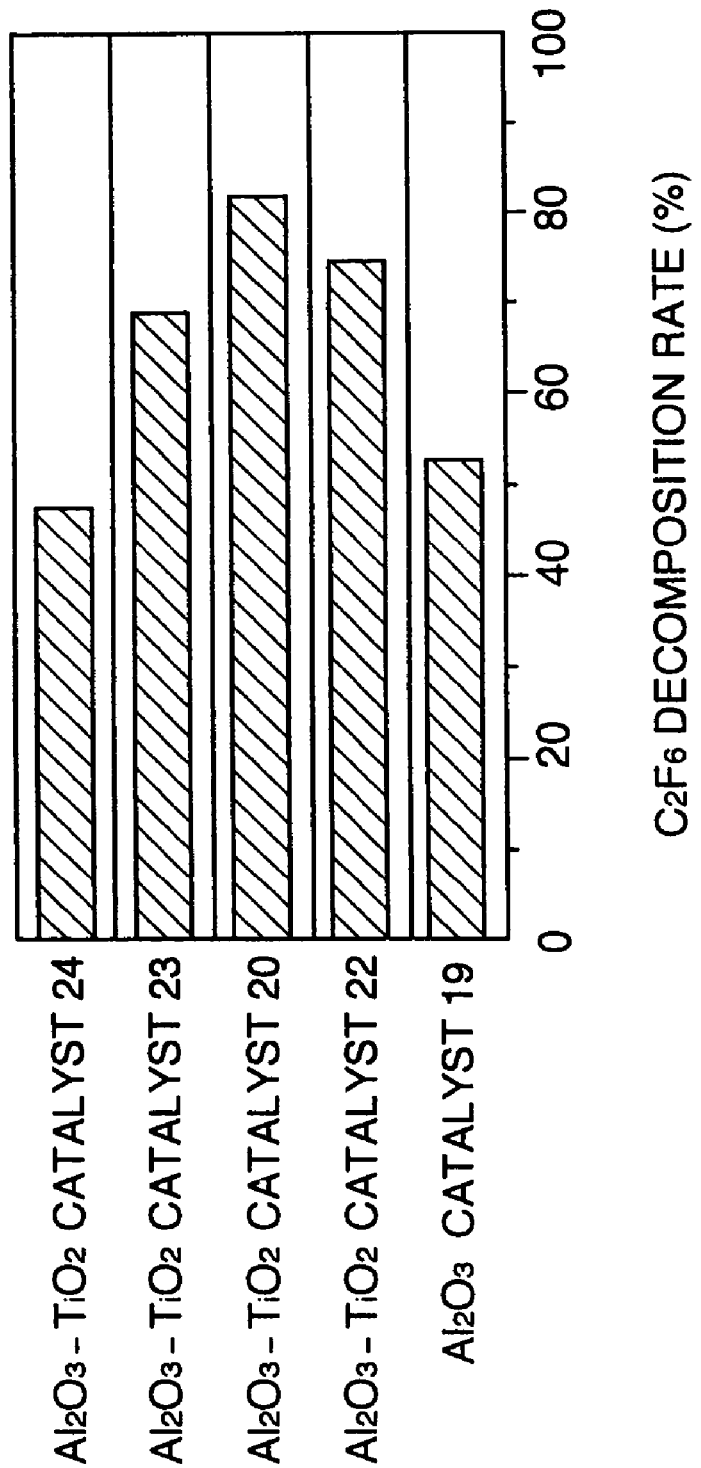
FIG. 5 is a graph showing performances of various catalysts for decomposing a fluorine compound.

Activities of catalysts 19, 20 and 22–24 are shown in FIG. 5, from which is evident that the highest $C_2F_6$ decomposition rate can be obtained at an alumina content of about 85% by weight.

EXAMPLE 4

In this Example, an influence of sulfuric acid during the preparation of the $Al_2O_3$—$TiO_2$ catalyst upon the $C_2F_6$ decomposition rate was investigated.

Catalyst 25: $Al_2O_3$—$TiO_2$

Boehmite powders (PURAL SB) was dried at 120° C. for one hour. 150 g of the resulting dried powders were kneaded with 58.5 g of 30% titania sol (CS-N, trademark of a product commercially available from Ishihara Sangyo Kaisha, Ltd., Japan) and an aqueous solution prepared by diluting 44.8 g of 97% sulfuric acid with 250 ml of pure water. After the kneading, the kneaded mixture was dried at 250°–300° C. for about 5 hours and then fired at 700° C. for 2 hours. The resulting powders were placed into a mold and compression molded under a pressure of 500 kgf/cm². The molded product was pulverized and sieved to obtain grains having grain sizes of 0.5–1 mm and tested. The resulting grain composition for catalyst was in an atomic ratio of Al:Ti=91:9 and in a weight ratio of $Al_2O_3:TiO_2$=86.3:13.7.

Sulfate ions were present in the catalyst. Test conditions were the same as in Example 1, except that the space velocity was changed to 1,000 h$^{-1}$. The test results revealed that a $C_2F_6$ decomposition rate of 80% was obtained at a reaction temperature of 650° C.

EXAMPLE 5

In this Example, $C_2F_6$ decomposition rates were investigated by adding various components to the $Al_2O_3$—$TiO_2$ catalysts. The catalysts were prepared as follows, but test procedure and conditions were the same as in Example 1.

Catalyst 9: $Al_2O_3$—$TiO_2$

Granular alumina (NKHD-24) was pulverized and sieved to obtain grains having grain sizes of 0.5–1 mm, followed by drying at 120° C. for 2 hours. Then, the dried grains were impregnated with 176 g of an aqueous 30% titanium sulfate solution. After the impregnation, the grains were dried at 250°–300° C. for about 5 hours and then fired at 700° C. for 2 hours. The resulting grain composition for catalyst was in an atomic ratio of Al:Ti=90:10 and in a weight ratio of $Al_2O:TiO_2$=85.1:14.9. The catalyst thus prepared was designated as catalyst A.

Catalyst 10: $Al_2O_3$—$TiO_2$—$ZrO_2$ 50 g of Catalyst A grains were impregnated with an aqueous solution of 6.7 g of zirconyl nitrate dihydrate in 38.4 g of $H_2O$. After the impregnation, the grains were dried at 120° C. for 2 hours and then fired at 700° C. for 2 hours. The resulting grain composition for catalyst was in an atomic ratio of Al:Ti:Zr=90:10:0.025 and in a weight ratio of $Al_2O_3:TiO_2:ZrO_2$=80.2:14.0:5.8.

Catalyst 11: $Al_2O_3$—$TiO_2$—$WO_3$ 50 g of Catalyst A grains were impregnated with 38.4 g of an aqueous solution of 6.5 g of ammonium paratungstate in $H_2O$. After the impregnation, the grains were dried at 120° C. for 2 hours and then fired at 700° C. for 2 hours. The resulting grain composition for catalyst was in an atomic ratio of Al:Ti:W=90:10:0.025 and in a weight ratio of $Al_2O_3:TiO_2:WO_3$=76.6:13.4:10.0.

Catalyst 12: $Al_2O_3$—$TiO_2$—$SiO_2$ 50 g of Catalyst A grains were impregnated with 38.4 g of an aqueous solution of 7.5 g of 20 wt. % silica sol in $H_2O$. After the impregnation, the grains were dried at 120° C. for 2 hours and then fired at 700° C. for 2 hours. The resulting grain composition for catalyst was in an atomic ratio of 90:10:0.025 and in a weight ratio of $Al_2O_3:TiO_2:SiO_2$=82.6: 14.5:2.9.

Catalyst 13: $Al_2O_2$—$TiO_2$—$SnO_2$ 50 g of Catalyst A grains were impregnated with 38.4 g of an aqueous solution of 5.6 g of tin chloride dihydrate in $H_2O$. After the impregnation, the grains were dried at 120° C. for 2 hours and then fired at 700° C. for 2 hours. The resulting grain composition for catalyst was in an atomic ratio of Al:Ti:Sn=90:10:0.025 and in a weight ratio of $Al_2O_3:TiO_2:SnO_2$=79.1:13.9:7.0.

Catalyst 14: $Al_2O_3$—$TiO_2$—$CeO_2$ 50 g of Catalyst A grains were impregnated with 38.4 g of an aqueous solution of 10.9 g of cerium nitrate hexahydrate in $H_2O$. After the impregnation, the grains were dried at 120° C. for 2 hours and then fired at 700° C. for 2 hours. The resulting grain composition for catalyst was in an atomic ratio of Al:Ti:Ce=90:10:0.025 and in a weight ratio of $Al_2O_3:TiO_2:CeO_2$=78.4:13.7:7.9.

Catalyst 15: $Al_2O_3$—$TiO_2$—$MnO_2$ 50 g of Catalyst A grains were impregnated with 38.4 g of an aqueous solution of 7.2 g of manganese nitrate hexahydrate in $H_2O$. After the impregnation, the grains were dried at 120° C. for 2 hours and then fired at 700° C. for 2 hours. The resulting grain composition for catalyst was in an atomic ratio of Al:Ti:Mn=90:10:0.025 and in a weight ratio of $Al_2O_3:TiO_2:MnO_2$=81.6:14.3:4.1.

Catalyst 16: $Al_2O_3$—$TiO_2$—$Bi_2O_3$ 50 g of Catalyst A grains were impregnated with 38.4 g of an aqueous solution of 12.13 g of bithmus nitrate hexahydrate in $H_2O$. After the impregnation, the grains were dried at 120° C. for 2 hours and then fired at 700° C. for 2 hours. The resulting grain composition for catalyst was in an atomic ratio of Al:Ti:Bi=90:10:0.025 and in a weight ratio of $Al_2O_3:TiO_2:Bi_2O_3$=85.1:14.8:1.1.

Catalyst 17: $Al_2O_3$—$TiO_2$—$NiO$ 50 g of Catalyst A grains were impregnated with 38.4 g of an aqueous solution of 7.3 g of nickel nitrate hexahydrate in $H_2O$. After the impregnation, the grains were dried at 120° C. for 2 hours and then fired at 700° C. for 2 hours. The resulting grain composition for catalyst was in an atomic ratio of Al:Ti:Ni=90:10:0.025 and in a weight ratio of $Al_2O_3:TiO_2:NiO$=82.0:14.4:3.6.

Catalyst 18: $Al_2O_3$—$TiO_2$—$BO_4$ 50 g of Catalyst A grains were impregnated with 38.4 g of an aqueous solution of 1.36 g of ammonium borate octahydrate in $H_2O$. After the impregnation, the grains were dried at 120° C. for 2 hours and then fired at 700° C. for 2 hours. The resulting grain composition for catalyst was in an atomic ratio of Al:Ti:B=90:10:0.005 and in a weight ratio of $Al_2O_3:TiO_2:BO_4$=85.65:14.827:0.008.

Figure 3:
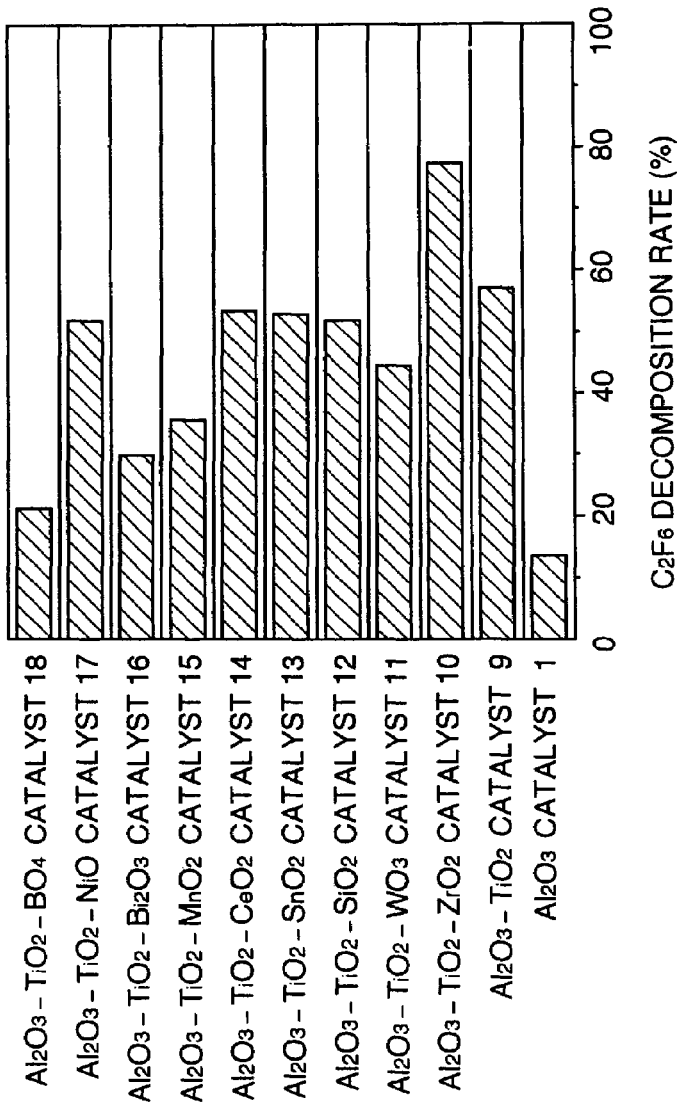
FIG. 3 is a graph showing performances of various catalysts for decomposing a fluorine compound.

It was found from FIG. 3 that the $Al_2O_3$—$TiO_2$—$ZrO_2$ catalyst had the highest activity.

EXAMPLE 6

In this Example, various catalysts containing alumina as one member were investigated for $C_2F_6$ decomposition rates under the following conditions:

A $C_2F_6$ gas having a purity of 99% or more was diluted with air, and the diluted gas was further admixed with steam to prepare a reaction gas. Steam was prepared by feeding pure water to a reactor tube from the top at a flow rate of about 0.2 ml/min. by a microtube pump to gasify the pure water. The reaction gas had a $C_2F_6$ concentration of about 0.5%, and was brought into contact with a catalyst heated to 700° C. by external heating of the reactor tube in an electric oven at a space velocity of 2,000 h$^{-1}$.

The reactor tube was an Inconel reactor tube having an inner diameter of 32 mm and had a catalyst bed fixed at the center of the reactor tube. An Inconel thermowell for a thermocouple, 3 mm in diameter, was inserted into the catalyst bed. Decomposition product gas from the catalyst bed was bubbled through an aqueous calcium fluoride solution and discharged to the system outside.

The following catalysts were prepared for the test under the foregoing conditions:

Catalyst 26

Boehmite powders (PURAL SB) were dried at 120° C. for one hour. 200 g of the resulting dried powders zinc nitrate hexahydrate and the mixture was kneaded. After the kneading, the kneaded mixture was dried at 250°–300° C. for about 2 hours and then fired at 700° C. for 2 hours. The fired product was pulverized and sieved to obtain grains having grain sizes of 0.5–1 mm and tested. The resulting grain composition for catalyst was in an atomic ratio of Al:Zn=91:9 and in a weight ratio of $Al_2O_3$:ZnO=86.4:13.6.

Catalyst 27

Boehmite powders (PURAL SB) were dried at 120° C. for one hour. 200 g of the resulting dried powders were admixed with an aqueous solution of 50.99 g of nickel sulfate hexahydrate and the mixture was kneaded. After the kneading, the kneaded mixture was dried at 250°–300° C. for about 2 hours and then fired at 700° C. for 2 hours. The fired product was pulverized and sieved to obtain grains having grain sizes of 0.5–1 mm. The resulting grain composition for catalyst was in an atomic ratio of Al:Ni=91:9 and in a weight ratio of $Al_2O_3$:NiO=87.3:12.7.

Catalyst 28

Boehmite powder (PURAL SB) were dried at 120° C. for one hour. 300 g of the resulting dried powders were admixed with an aqueous solution of 125.04 g of nickel nitrate hexahydrate and the mixture was kneaded. After the kneading, the kneaded mixture was dried at 250°–300° C. for about 2 hours and then fired at 700° C. for 2 hours. The fired product was pulverized and sieved to obtain grains having grain sizes of 0.5–1 mm. The resulting grain composition for catalyst was in an atomic ratio of Al:Ni=91:9 and in a weight ratio of $Al_2O_3$:NiO=87.3:12.7.

Catalyst 29

Boehmite powders (PURAL SB) were dried at 120° C. for one hour. 300 g of the resulting dried powders were kneaded with 354.4 g of an aqueous 30% titanium sulfate solution while adding about 300 g of pure water thereto. After the kneading, the kneaded mixture was dried at 250°–300° C. for about 5 hours and then fired at 700° C. for 2 hours. The fired product was pulverized and sieved to obtain grains having grain sizes of 0.5–1 mm and tested. The resulting grain composition for catalyst was in an atomic ratio of Al:Ti=91:9 and in a weight ratio of $Al_2O_3$:$TiO_2$=86.6:13.4.

Catalyst 30

Boehmite powders (PURAL SB) were dried at 120° C. for one hour. 200 g of the resulting dried powders were admixed with an aqueous solution of 115.95 g of iron nitrate nonahydrate and the mixture was kneaded. After the kneading, the kneaded mixture was dried at 250°–300° C. for about 2 hours and then fired at 700° C. for 2 hours. The fired product was pulverized and sieved to obtain grains having grain sizes of 0.5–1 mm, and tested. The resulting grain composition was in an atomic ratio of Al:Fe=91:9.

Catalyst 31

Boehmite powder (PURAL SB) were dried at 120° C. for one hour. 200 g of the resulting dried powders were admixed with an aqueous solution of 95.43 g of tin chloride hydrate and the mixture was kneaded. After the kneading, the kneaded mixture was dried at 250°–300° C. for about 2 hours and then dried at 700° C. for 2 hours. The fired product was pulverized and sieved to obtain grains having grain sizes of 0.5–1 mm and tested. The resulting grain composition for catalyst was in an atomic ratio of Al:Sn=91:9 and in a weight ratio of $Al_2O_3$:$SnO_2$=77.4:22.6.

Catalyst 32

Boehmite powders (PURAL SB) were dried at 120° C. for one hour. 200 g of the resulting dried powders were admixed with an aqueous solution prepared by diluting 22.2 g of a dinitrodiamino Pt(II) nitric acid solution (Pt concentration: 4.5 wt. %) with 200 ml of pure water, and the mixture was kneaded. After the kneading, the kneaded mixture was dried at 250°–300° C. for about 2 hours and then fired at 700° C. for 2 hours. The fired product was pulverized and sieved to obtain grains having grain sizes of 0.5–1 mm and tested. The resulting grain composition for catalyst was in a weight ratio of $Al_2O_3$:Pt=100:0.68.

Catalyst 33

Boehmite powders (PURAL SB) were dried at 120° C. for one hour. 300 g of the resulting dried powders were admixed with an aqueous solution of 125.87 g of cobalt nitrate hexahydrate, and the mixture was kneaded. After the kneading, the kneaded mixture was dried at 250°–300° C. for about 2 hours and then fired at 700° C. for 2 hours. The fired product was pulverized and sieved to obtain grains having grain sizes of 0.5–1 mm and tested. The resulting grain composition was in an atomic ratio of Al:Co=91:9.

Catalyst 34

Boehmite powder (PURAL SB) were dried at 120° C. for one hour. 200 g of the resulting dried powders were admixed with an aqueous solution of 76.70 g of zirconyl nitrate dihydrate, and the mixture was kneaded. After the kneading, the kneaded mixture was dried at 250°–300° C. for about 2 hours and then fired at 700° C. for 2 hours. The fired product was pulverized and sieved to obtain grains having grain sizes of 0.5–1 mm and tested. The resulting grain composition for catalyst was in an atomic ratio of Al:Zr=91:9 and in a weight ratio of $Al_2O_3$:$ZrO_2$=80.7:19.3.

Catalyst 35

Boehmite powders (PURAL SB) were dried at 120° C. for one hour. 200 g of the resulting dried powders were admixed with an aqueous solution of 124.62 g of cerium nitrate hexahydrate, and the mixture was kneaded. After the kneading, the kneaded mixture was dried at 250°–300° C. for about 2 hours and then fired at 700° C. for 2 hours. The fired product was pulverized and sieved to obtain grains having grain sizes of 0.5–1 mm and tested. The resulting grain composition for catalyst was in an atomic ratio of Al:Ce=91:9 and in a weight ratio of $Al_2O_3$:$CeO_2$=75.0:25.0.

Catalyst 36

Boehmite powders (PURAL SB) were dried at 120° C. for one hour. 300 g of the resulting dried powders were admixed with an aqueous solution of 129.19 g of 20 wt. % silica sol, and the mixture was kneaded. After the kneading, the kneaded mixture was dried at 250°–300° C. for about 2 hours and then fired at 700° C. for 2 hours. The fired product was pulverized and sieved to obtain grains having grain sizes of 0.5–1 mm and tested. The resulting grain composition for catalyst was in an atomic ratio of Al:Si=91:9 and in a weight ratio of $Al_2O_3$:$SiO_2$=89.6:10.4.

Figure 6:
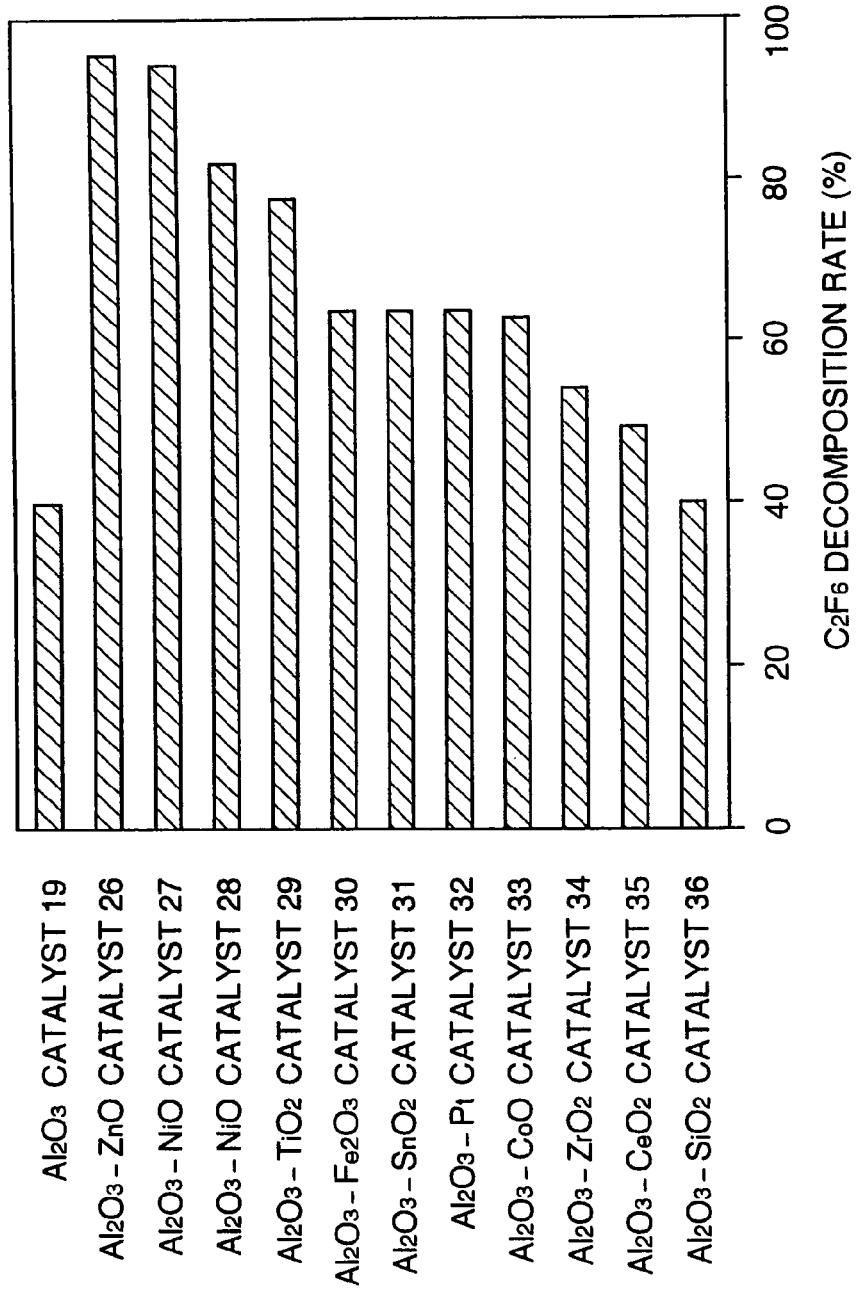
FIG. 6 is a graph showing performances of various catalysts for decomposing a fluorine gas.

Test results of the foregoing catalysts 19 and 26–36 at a reaction temperature of 700° C. are shown in FIG. 6, $C_2F_6$ decomposition activity is highest with the $Al_2O_3$—$ZnO_2$ catalyst and is lowered in the order of the $Al_2O_3$—NiO catalyst, and the $Al_2O_3$—$TiO_2$ catalyst. The highest activity of catalyst 26 seems to be due to the effect of S.

EXAMPLE 7

In this Example, changes in the activity of $Al_2O_3$—NiO catalyst 28 were investigated by changing atomic ratios of Al:Ni. Test procedure and conditions were the same as in Example 6 except that the $C_2F_6$ concentration was changed to 2% and the feed rate of pure water to 0.4 ml/min.

Catalyst 28-1

Boehmite powders (PURAL SB) were dried at 120° C. for one hour. 200 g of the resulting dried powder were admixed with an aqueous solution of 8.52 g of nickel nitrate hexahydrate, and the mixture was kneaded. After the kneading, the kneaded mixture was dried at 250°–300° C. for about 2 hours and then fired at 700° C. for 2 hours. The fired product was pulverized and sieved to obtain grains having grain sizes of 0.5–1 mm. The resulting grain composition for catalyst was in an atomic ratio of Al:Ni=99:1 and in a weight ratio of $Al_2O_3$:NiO=98.5:1.5.

Catalyst 28-2

Boehmite powders (PURAL SB) were dried at 120° C. for one hour. 300 g of the resulting powders were admixed with an aqueous solution of 66.59 g of nickel nitrate hexahydrate, and the mixture was kneaded. After the kneading, the kneaded mixture was dried at 250°–300° C. for about 2 hours and then fired at 700° C. for 2 hours. The fired product was pulverized and sieved to obtain grains having grain sizes of 0.5–1 mm. The resulting grain composition for catalyst was in an atomic ratio of Al:Ni=95:5 and in a weight ratio of $Al_2O_3$:NiO=92.8:7.2.

Catalyst 28-3

Boehmite powders (PURAL SB) were dried at 120° C. for one hour. 200 g of the resulting dried powders were admixed with an aqueous solution of 210.82 g of nickel nitrate hexahydrate, and the mixture was kneaded. After the kneading, the kneaded mixture was dried at 250°–300° C. for about 2 hours and then fired at 700° C. for 2 hours. The fired product was pulverized and sieved to obtain grains having grain sizes of 0.5–1 mm. The resulting grain composition for catalyst was in an atomic ratio of Al:Ni=80:20 and in a weight ratio of $Al_2O_3$:NiO=73.2:26.8.

Catalyst 28-4

Boehmite powders (PURAL SB) were dried at 120° C. for one hour. 200 g of the resulting dried powders were admixed with an aqueous solution of 361.16 g of nickel nitrate hexahydrate, and the mixture was kneaded. After the kneading, the kneaded mixture was dried at 250°–300° C. for about 2 hours and then fired at 700° C. for 2 hours. The fired product was pulverized and sieved to obtain grains having grain sizes of 0.5–1 mm. The resulting grain composition for catalyst was in an atomic ratio of Al:Ni=70:30 and in a weight ratio of $Al_2O_3$:NiO=61.4:38.6.

Catalyst 28-5

Boehmite powders (PURAL SB) were dried at 120° C. for one hour. 200 g of the resulting dried powders were admixed with 562.1 g of nickel nitrate hexahydrate, and the mixture was kneaded while adding water thereto. After the kneading, the kneaded mixture was dried at 250°–300° C. for about 2 hours and then fired at 700° C. for 2 hours. The fired product was pulverized and sieved to obtain grains having grain sizes of 0.5–1 mm. The resulting grain composition for catalyst was in an atomic ratio of Al:Ni=60:40 and in a weight ratio of $Al_2O_3$:NiO=50.6:49.4.

Figure 7:
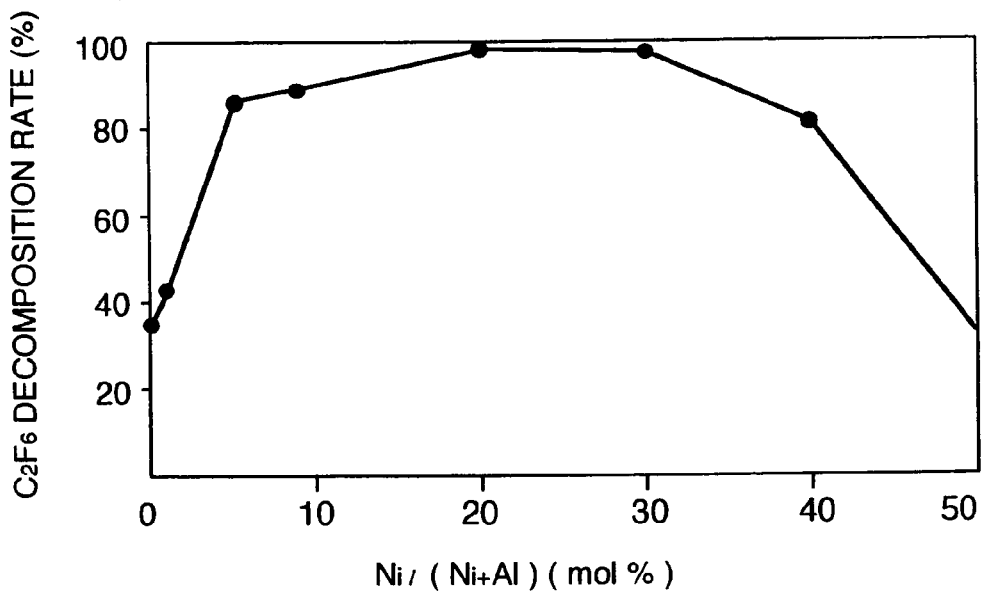
FIG. 7 is a graph showing performance of catalysts with various composition ratios for decomposing a fluorine gas.

$C_2F_6$ decomposition rate 6 hours after the start of test is shown in FIG. 7. It was found that the Ni content of $Al_2O_3$—NiO catalysts is in a range of 5 to 40 atom %, preferably 20 to 30 atom %.

EXAMPLE 8

In this Example, changes in the activity of $Al_2O_3$—ZnO catalyst 26 was investigated by changing atomic ratios of Al:Zn. Test procedure and conditions were the same as in Example 6 except that the $C_2F_6$ concentration was changed to 2% and the feed rate of pure water to 0.4 ml/min.

Catalyst 26-1

Boehmite powders (PURAL SB) were dried at 120° C. for one hour. 200 g of the resulting dried powders were admixed with an aqueous solution of 215.68 g of zinc nitrate hexahydrate and the mixture was kneaded. After the kneading, the kneaded mixture was dried at 250°–300° C. for about 2 hours and then fired at 700° C. for 2 hours. The fired product was pulverized and sieved to obtain grains having grain sizes of 0.5–1 mm. The resulting grain composition for catalyst was in an atomic ratio of Al:Zn=80:20 and in a weight ratio of $Al_2O_3$:ZnO=71.5:28.5.

Catalyst 26-2

Boehmite powders (PURAL SB) were dried at 120° C. for one hour. 200 g of the resulting dried powders were admixed with 369.48 g of zinc nitrate hexahydrate and the mixture was kneaded. After the kneading, the kneaded mixture was dried at 250°–300° C. for about 2 hours and fired at 700° C. for 2 hours. The fired product was pulverized and sieved to obtain grains having grain sizes of 0.5–1 mm. The resulting grain composition for catalyst was in an atomic ratio of Al:Zn=70:30 and in a weight ratio of $Al_2O_3$:ZnO=59.4:40.6.

Catalyst 26-3

Boehmite powders (PURAL SB) were dried at 120° C. for one hour. 126.65 g of the resulting dried powders were admixed with an aqueous solution of 96.39 g of zinc nitrate hexahydrate, and the mixture was kneaded. After the kneading, the kneaded mixture was dried at 250°–300° C. for about 2 hours and then fired at 700° C. for 2 hours. The fired product was pulverized and sieved to obtain grains having grain sizes of 0.5–1 mm. The resulting grain composition for catalyst was in an atomic ratio of Al:Zn=85:15 and in a weight ratio of $Al_2O_3$:ZnO=78.0:22.0.

Figure 8:
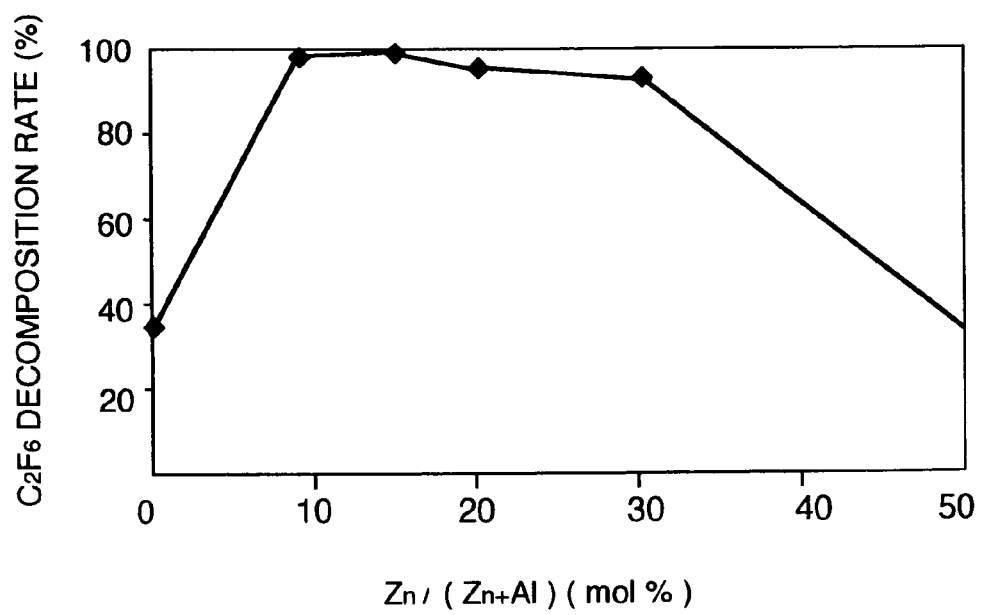
FIG. 8 is a graph showing performance of catalysts with various composition ratios for decomposing a fluorine gas.

$C_2F_6$ decomposition rate 6 hours after the start of test is shown in FIG. 8. It was found that the Zn content of $Al_2O_3$—$ZnO_2$ catalysts is in a range of 10 to 30 atom %, preferably 10 to 15 atom %.

EXAMPLE 9

Figure 9:
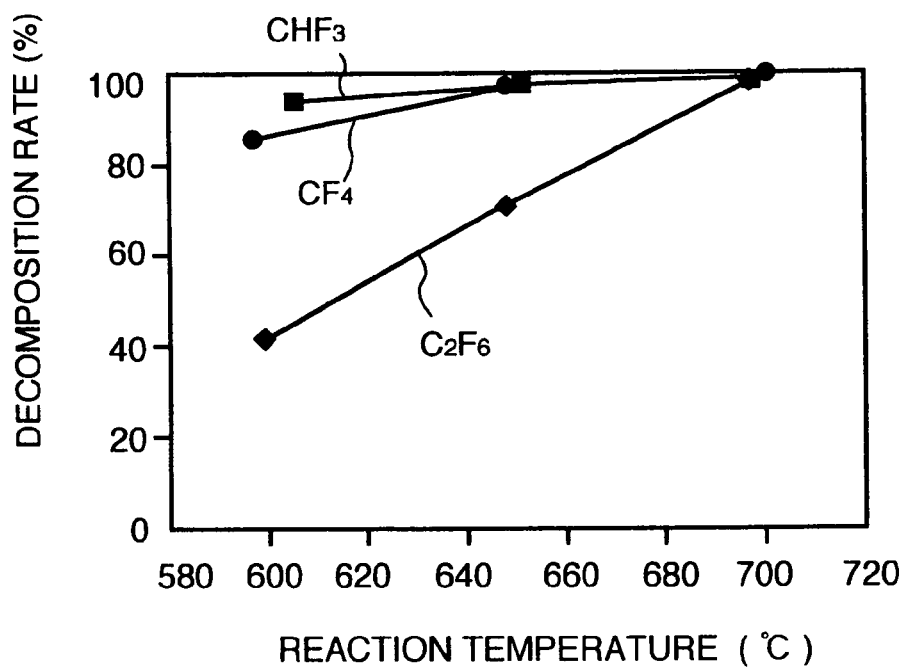
FIG. 9 is a graph showing relations between reaction temperature and decomposition rate of various fluorine compounds.

In this Example, decomposition of $CF_4$ and $CHF_3$ was carried out with a $Al_2O_3$—NiO catalyst 28-3 under the same test procedure and conditions as in Example 6, except that the space velocity was changed to 1,000 $h^{-1}$ and the fluorine compound was diluted with nitrogen in place of air. Test results at various reaction temperatures are shown in FIG. 9. It was found that the decomposition activity of $Al_2O_3$—NiO catalyst upon $CF_4$ gas and $CHF_3$ gas is higher than upon $C_2F_6$ gas and the $Al_2O_3$—NiO catalyst is a preferable hydrolysis catalyst for $CF_4$ or $CHF_3$. Furthermore, it was found that a preferable reaction temperature is 600°–700° C. for the decomposition of $CF_4$ and $CHF_3$, and 650°–700° C. for the decomposition of $C_2F_6$. The higher the reaction temperature, the higher the decomposition rate. However, substantially 100% decomposition rate can be obtained at 700° C., and thus a higher reaction temperature than 700° C. will be meaningless, and a reaction temperature must be as high as 800° C.

EXAMPLE 10

Figure 10:
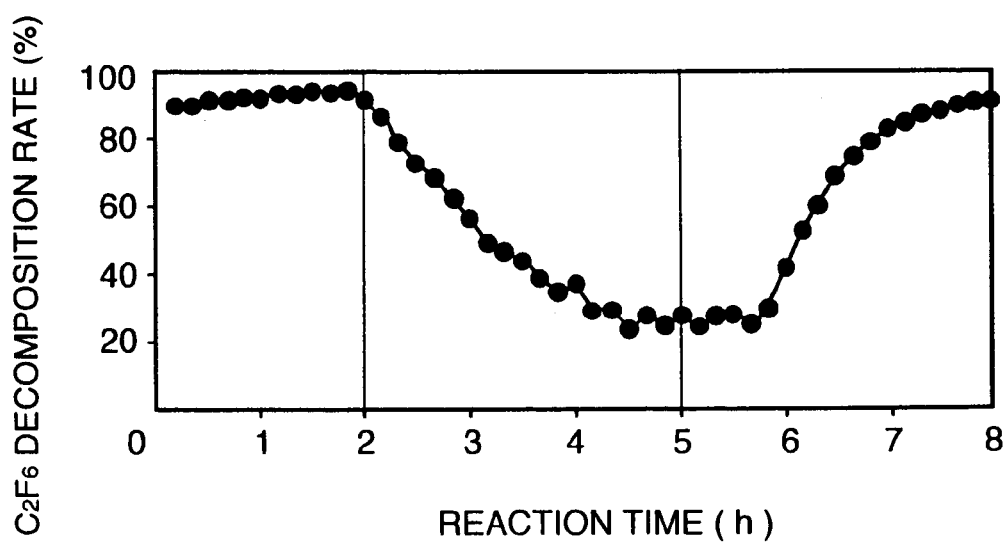
FIG. 10 is a graph showing relations between reaction time and decomposition rate of a fluorine compound.

In this Example, influences of steam upon $C_2F_6$ decomposition were investigated under the same test conditions as in Example 6 except that the space velocity was changed 1,000 h$^{-1}$. Al$_2$O$_3$—NiO catalyst 28-3 was used at a reaction temperature of 700° C. while supplying steam for 2 hours from the start of test, then interrupting supply of steam for 3 hours, and then starting to supply steam again. Test results are shown in FIG. 10. It was found that during the supply of steam the C$_2$F$_6$ reaction rate was elevated due to the occurrence of C$_2$F$_6$ hydrolysis.

EXAMPLE 11

In this Example, decomposition of SF$_6$ was investigated with Al$_2$O$_3$—NiO catalyst 28-3 under the same test conditions as in Example 6 except that a SF$_6$ gas having a purity of 99% or more was used, the space velocity was changed to 1,000 h$^{-1}$ and the SF$_6$ gas was diluted with nitrogen in of air. The reaction temperature was 700° C. Concentration of SF$_6$ in the reaction gas at the inlet to the reactor tube and concentration of SF$_6$ in the decomposition gas at the outlet from the alkaline washing step were determined by TCD gas chromatography and the decomposition rate was calculated by the following equation. It was found that the decomposition rate was 99% or more.

$$\text{Decomposition rate} = 1 - \frac{\text{Concentration of discharged SF}_6}{\text{Concentration of fed SF}_6} \times 100\,(\%)$$

EXAMPLE 12

In this Example, decomposition of NF$_3$ was investigated with Al$_2$O—NiO catalyst 28-3 under the same test conditions as in Example 11 except that a NF$_3$ gas having a purity of 99% or more was used. Reaction temperature was 700° C. Concentration of NF$_3$ in the reaction gas at the inlet to the reactor tube and concentration of NF$_3$ in the decomposition gas at the outlet from the alkaline washing step were determined by TCD gas chromatography and the decomposition rate was calculated according to the following equation. It was found that the decomposition rate was 99% or more. It was found preferable to carry out the decomposition of the NF$_3$ gas with the Al$_2$O$_3$—NiO catalyst at a temperature of 600°–800° C.

$$\text{Decomposition rate} = \frac{\text{Concentration of discharged NF}_3}{\text{Concentration of fed NF}_3} \times 100\,(\%)$$

EXAMPLE 13

In this Example, activity of Al$_2$O$_3$—ZnO catalyst upon hydrolysis of a CF$_4$ gas, a C$_4$F$_8$ gas and a CHF$_3$ gas was investigated. Decomposition of a CF$_4$ gas was carried out in the following manner:

At first, a CF$_4$ gas having a purity of 99% or more was diluted with air, and the diluted CF$_4$ gas was further admixed with steam. Concentration of CF$_4$ in the reaction gas was about 0.5%, and steam flow rate was adjusted to about 50 times as high as that of the fluorine compound, i.e. CF$_4$. The reaction gas was brought into contact with the catalyst heated to a predetermined temperature in a reactor tube in an electric oven at a space velocity of 1,000 h$^{-1}$. Decomposition product gas from the catalyst bed was bubbled through an aqueous sodium hydroxide solution and then discharged to the system outside. Decomposition rate of CF$_4$ was determined by TCD gas chromatography.

The Al$_2$O$_3$—ZnO catalyst used for the test was prepared in the following manner:

Boehmite powders (PURAL SB) were dried at 120° C. for one hour. 126.65 g of the resulting dried powders were admixed with 96.39 g of zinc nitrate hexahydrate, and the mixture was kneaded. After the kneading, the kneaded mixture was dried at 250°–300° C. for about 2 hours and then fired at 700° C. for 2 hours. The fired product was pulverized and sieved to obtain grains having grain sizes of 0.5–1 mm. The resulting grain composition for catalyst was in an atomic ratio of Al:Zn=85:15 and in a weight ratio of Al$_2$O$_3$:ZnO=78:22.

Figure 11:
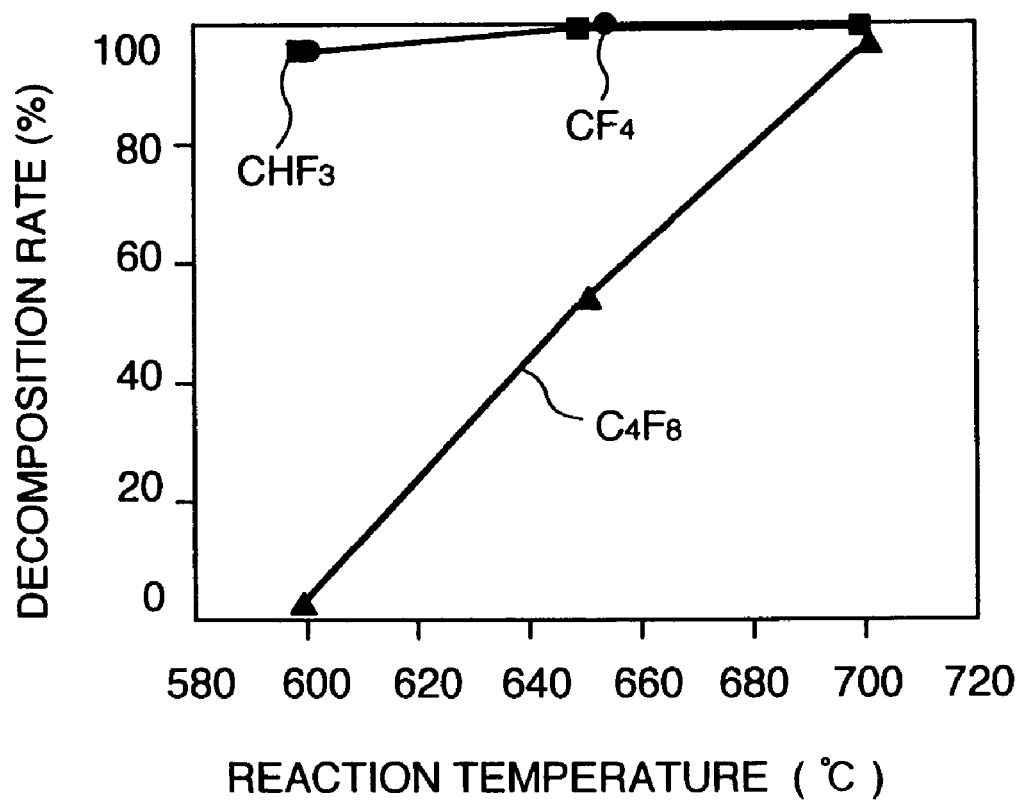
FIG. 11 is a graph showing relations between reaction temperature and decomposition rate of $CHF_3$, $CF_4$ and $C_4H_8$ by an $Al_2O_3$—ZnO catalyst.

FIG. 11 shows decomposition rates of CF$_4$ at various reaction temperatures and also those of CHF$_3$ and C$_4$F$_8$ as fed and decomposed in the same manner as above. Decomposition rates of CHF$_3$ and C$_4$F$_8$ were determined by FID gas chromatography, whereby it was found that the Al$_2$O$_3$—ZnO catalyst had a higher activity upon the CF$_4$ gas, the C$_4$F$_8$ gas and the CHF$_3$ gas. It was also found that a higher decomposition rate can be obtained preferably at a reaction temperature of 650° C. or higher for the hydrolysis of the C$_4$F$_8$ gas and even at a reactor temperature of 600° C. or lower for the hydrolysis of the CHF$_3$ gas or the CF$_4$ gas.

EXAMPLE 14

In this Example, the decomposition activity of as Al$_2$O$_3$—NiO catalyst upon a C$_3$F$_8$ gas, a C$_4$F$_8$ gas and a SF$_6$ gas was investigated in the same manner as in Example 13. The concentration of C$_4$F$_8$ in the reaction gas after decomposition of C$_4$F$_8$ was 0.1% by volume. The Al$_2$O$_3$—NiO catalyst used for the test was prepared in the following manner:

Boehmite powders (PURAL SB) were dried at 120° C. for one hour. 200 g of the resulting dried powders were admixed with an aqueous solution of 210.82 g of nickel nitrate hexahydrate, and the mixture was kneaded. After the kneading, the kneaded mixture was dried at 250°–300° C. for about 2 hours, and then fired at 700° C. for 2 hours. The fired product was pulverized and sieved to obtain grains having grain sizes of 0.5–1 mm. The resulting grain composition for catalyst was in an atomic ratio of Al:Ni=80:20 and in a weight ratio of Al$_2$O$_3$:NiO=73.2:26.8.

Figure 12:
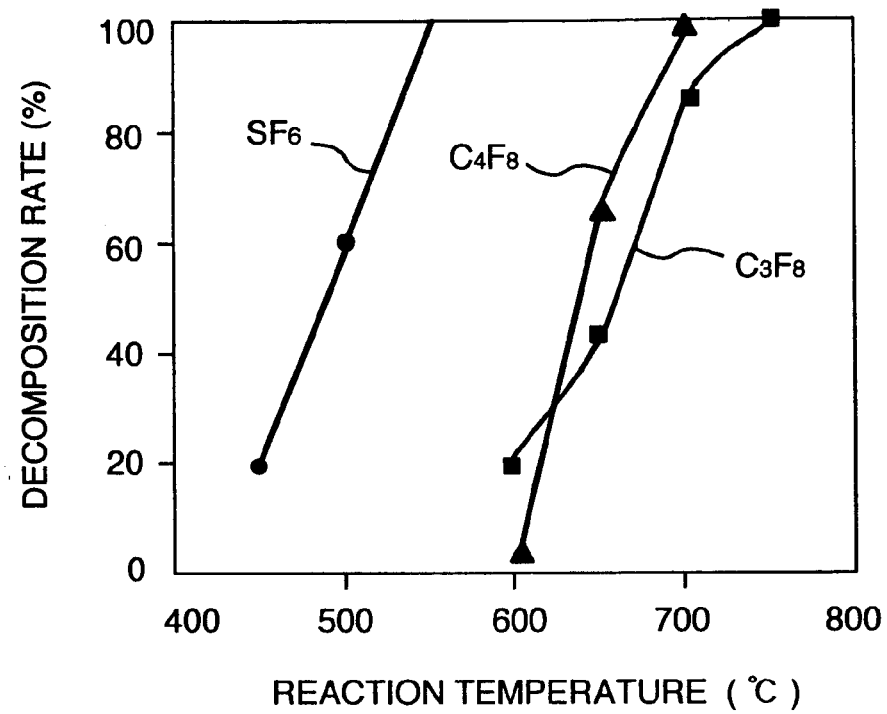
FIG. 12 is a graph showing relations between reaction temperature and decomposition rate of $SF_6$ and $C_3F_8$ by an $Al_2O_3$—NiO catalyst.

FIG. 12 shows decomposition rates at various reaction temperatures, where the decomposition rate of C$_3$F$_8$ and C$_4$F$_8$ was determined by FID gas chromatography and that of SF$_6$ by TCD gas chromatography. It was found from the test results that the Al$_2$O$_3$—NiO catalyst had a higher activity upon the hydrolysis of the SF$_6$ gas, C$_3$F$_8$ gas and the C$_4$F$_8$ gas, and the reaction temperature was preferably 500° C. or higher for the hydrolysis of the SF$_6$ gas and preferably 700° C. or higher for the hydrolysis of the C$_3$F$_8$ gas. In the case of C$_4$F$_8$ gas, the reaction temperature for the hydrolysis was preferably 650° C. or higher.

EXAMPLE 15

In this Example, decomposition activity of an Al$_2$O$_3$—NiO—ZnO catalyst upon C$_4$F$_8$ was investigated in the same manner as in Example 13. The Al$_2$O$_3$—NiO—ZnO catalyst used for the test was prepared in the following manner:

Boehmite powders (PURAL SB) were dried at 120° C. for one hour. 200 g of the resulting dried powders were admixed with 210.82 g of nickel nitrate hexahydrate and 152.31 g of zinc nitrate hexahydrate, and the mixture was kneaded while adding pure water thereto. After the kneading, the kneaded mixture was dried at 250°–300° C. for about 2 hours and then fired at 700° C. for 2 hours. The fired product was pulverized and sieved to obtain grains having grain sizes of 0.5–1 mm. The resulting grain composition for catalyst was in atomic ratios of Al:Ni=80:20 and Al:Zn=85:15 and in a weight ratio of $Al_2O_3$:NiO:ZnO=60.7:22.2:17.1.

Figure 13:
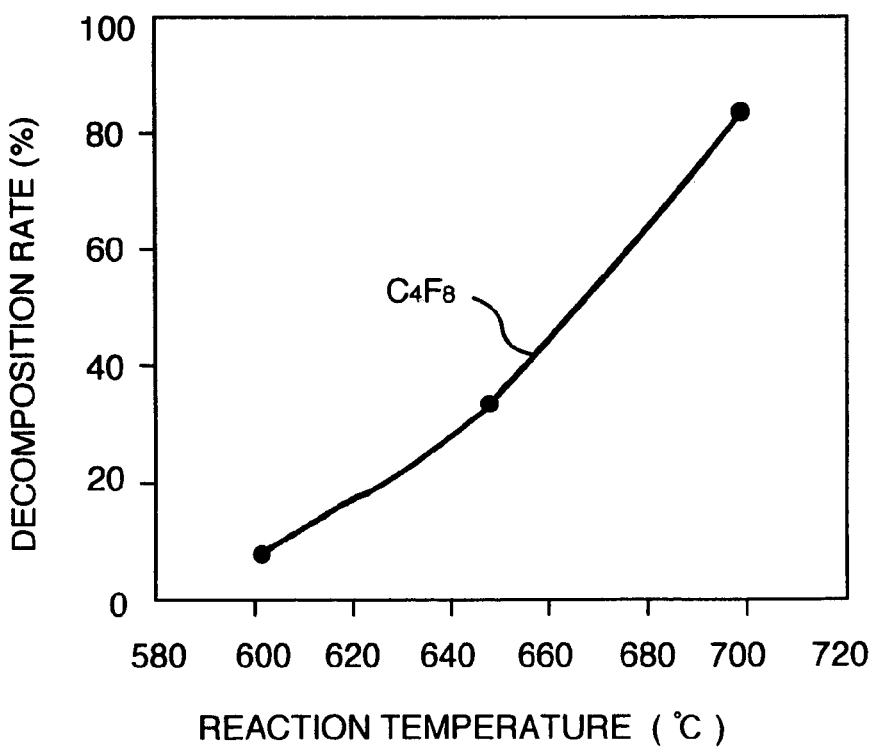
FIG. 13 is a graph showing relations between reaction temperature and decomposition rate of $C_4F_8$ by an $Al_2O_3$—NiO—ZnO catalyst.

FIG. 13 shows decomposition rates at various reaction temperatures, where the decomposition rate of $C_4F_8$ was determined by FID gas chromatography.

What is claimed is:

1. A process for treating a gas, which comprises contacting a gas stream containing at least one of a compound consisting of carbon, hydrogen, fluorine and oxygen with a catalyst at a temperature of 400 to 800° C. in the presence of steam vapor, said catalyst comprising aluminum oxide and nickel oxide, and
   decomposing the compound by hydrolysis and producing a treated gas containing hydrogen fluoride.

2. A process according to claim 1, which further comprises washing the treated gas with water to remove the hydrogen fluoride.

3. A process according to claim 1, which further comprises washing the treated gas with an alkaline solution or slurry to remove the hydrogen fluoride.

4. A process according to claim 1, which further comprises washing the treated gas with water and subsequently contacting the water that has absorbed the hydrogen fluoride with an alkaline solution or slurry.

5. A process according to claim 1, wherein the catalyst further comprises at least one of zinc oxide and titanium oxide.

6. A process according to claim 1, wherein the catalyst consists essentially of alumina and nickel oxide.

7. A process according to claim 1, wherein the compound is $CH_2OCF_2$.

8. A process for treating a fluorine compound-containing gas, which comprises
   contacting a gas stream containing at least one of a compound consisting of carbon, hydrogen, oxygen and fluorine with a catalyst comprising alumina as an active component and nickel oxide, said catalyst containing a composite oxide of alumina and nickel oxide,
   adding steam or a reaction gas containing steam and oxygen to the gas stream, and
   effecting a hydrolysis reaction between the at least one of a compound and the steam, thereby producing a treated gas containing hydrogen fluoride.

9. A process according to claim 8, which further comprises washing the treated gas with water to remove the hydrogen fluoride.

10. A process according to claim 8, which further comprises washing the treated gas with an alkaline solution or slurry to neutralize the hydrogen fluoride and other acidic compounds.

11. A process according to claim 8, which further comprises washing the treated gas with water and subsequently neutralizing the water that has absorbed the hydrogen fluoride with an alkaline solution or slurry.

12. A process according to claim 8, wherein the catalyst further comprises zinc oxide.

13. A process according to claim 8, wherein the catalyst consists essentially of alumina and nickel oxide.

14. A process according to claim 8, wherein the compound is $CH_2OCF_2$.

15. A process according to claim 1, wherein the catalyst contains 7.2 to 49.4% by weight of nickel oxide.

16. A process according to claim 8, wherein the catalyst contains 7.2 to 49.4% by weight of nickel oxide.

* * * * *